United States Patent [19]

Kirino et al.

[11] Patent Number: 5,848,045
[45] Date of Patent: Dec. 8, 1998

[54] METHOD FOR RECORDING AND READING AN OPTICAL DISK

[75] Inventors: Fumiyoshi Kirino, Suginami-ku; Tsuyoshi Toda; Hiroshi Ide, both of Kodaira; Hisataka Sugiyama, Kodaira; Atsushi Saito, Ichikawa; Hiroyuki Tsuchinaga; Takeshi Maeda, both of Kokubunji; Fumio Kugiya, Hachiouji; Toshimitsu Kaku, Sagamihara; Seiichi Mita, Tsukui-gun; Kazuo Shigematsu, Kitakatsushika-gun; Yasuhide Ouchi, Odawara, all of Japan

[73] Assignee: Hitachi, Ltd., Tokyo, Japan

[21] Appl. No.: 968,526

[22] Filed: Nov. 12, 1997

Related U.S. Application Data

[62] Division of Ser. No. 220,428, Mar. 30, 1994, Pat. No. 5,703,855.

[30] Foreign Application Priority Data

| Apr. 6, 1993 | [JP] | Japan | 5-079340 |
| Jul. 14, 1993 | [JP] | Japan | 5-174357 |
| Aug. 5, 1993 | [JP] | Japan | 5-194630 |

[51] Int. Cl.$^6$ .................................................. G11B 7/00
[52] U.S. Cl. ............................ 369/116; 369/54; 369/58; 369/59
[58] Field of Search ................................ 369/116, 59, 58, 369/54, 50, 47, 48, 49, 124

[56] References Cited

U.S. PATENT DOCUMENTS

| 4,631,713 | 12/1986 | Romeas et al. . |
| 4,873,680 | 10/1989 | Chung et al. . |
| 5,001,690 | 3/1991 | Kamiya et al. . |
| 5,151,924 | 9/1992 | Mita et al. . |
| 5,166,914 | 11/1992 | Shimada et al. . |
| 5,181,161 | 1/1993 | Hirose et al. . |
| 5,206,848 | 4/1993 | Kusano et al. . |
| 5,216,649 | 6/1993 | Koike et al. . |
| 5,646,930 | 7/1997 | Furumiya .............................. 369/54 X |
| 5,673,249 | 9/1997 | Hasegawa et al. .................... 369/54 X |

FOREIGN PATENT DOCUMENTS

| 0400726A1 | 5/1990 | European Pat. Off. . |
| 60-214463 | 10/1985 | Japan . |
| 60-231930 | 11/1985 | Japan . |
| 1-134726A | 5/1989 | Japan . |
| 2-089228A | 3/1990 | Japan . |
| 2-170613 | 7/1990 | Japan . |
| 2-185727 | 7/1990 | Japan . |
| 3-22223 | 1/1991 | Japan . |
| 3-183025 | 8/1991 | Japan . |
| 4-137224A | 5/1992 | Japan . |

Primary Examiner—Muhammad N. Edun
Attorney, Agent, or Firm—Pennie & Edmonds LLP

[57] ABSTRACT

A super high density optical disk apparatus is obtained by using an exchangeable recording medium having a recording capacity of at least 1.5 Gb/in$^2$ in an optical recording and reading apparatus for recording or reading at least using a laser beam or by using one of means which can record on a recording medium only once and means which can record at least two times repeatedly as recording means to be used.

14 Claims, 18 Drawing Sheets

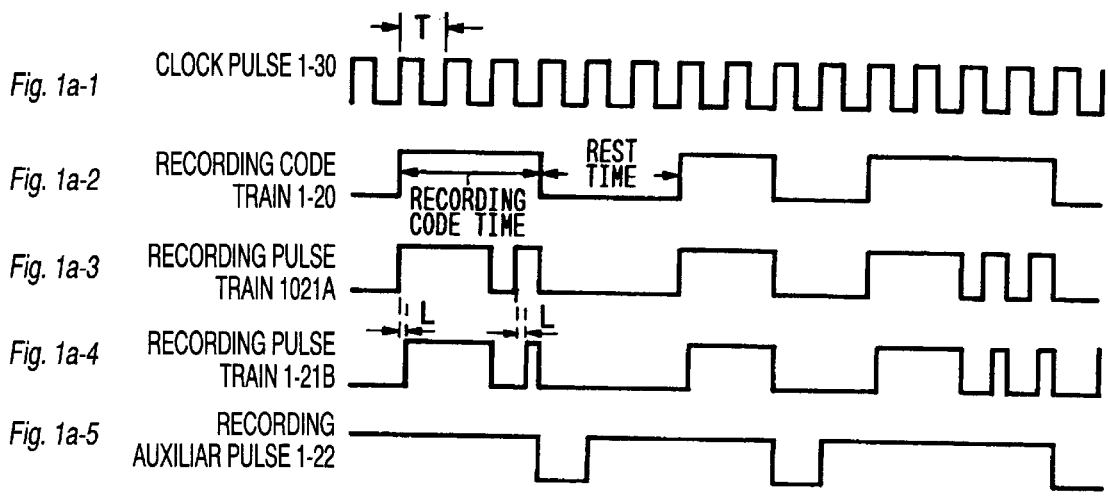
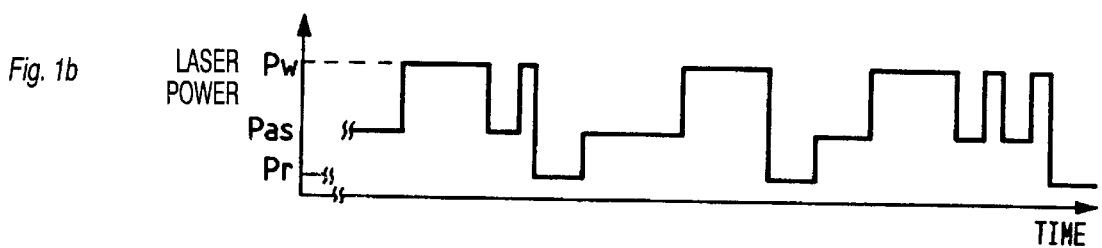
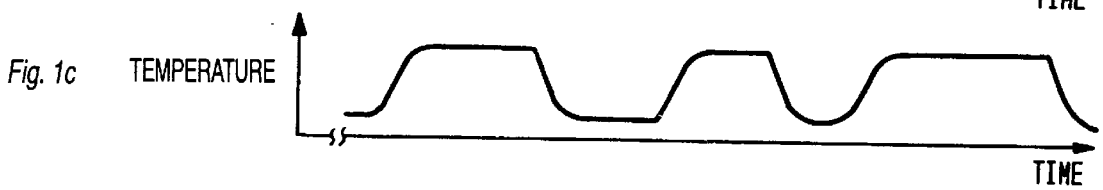

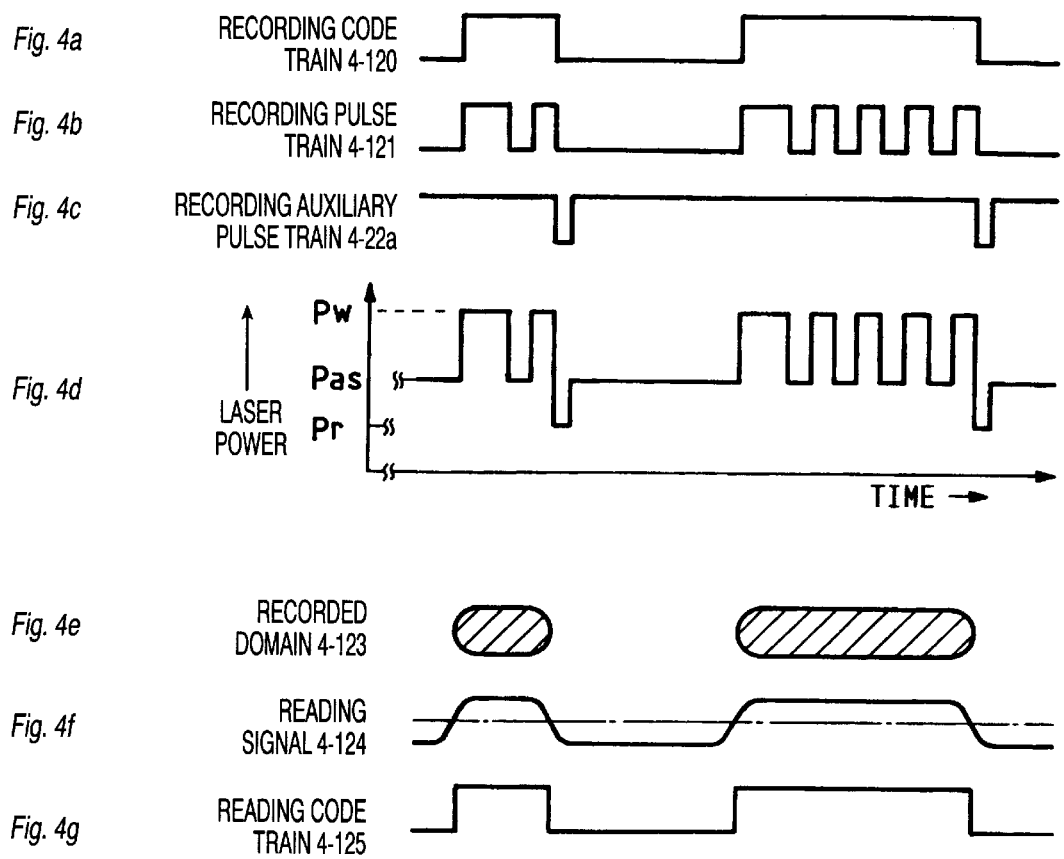

Fig. 20a-1
IN THE CASE OF THE POSITIVE DISK
TILT ON THE RADIAL DIRECTION
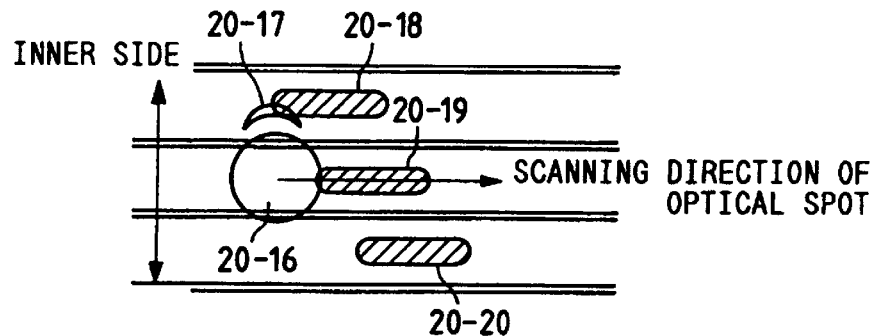
Fig. 20a-2 READING SIGNAL WAVEFORM
TAP COEFFICIENT : C(-1) < C(+1)
IN THE CASE OF THE NEGATIVE DISK
TILT ON THE RADIAL DIRECTION
Fig. 20b-1
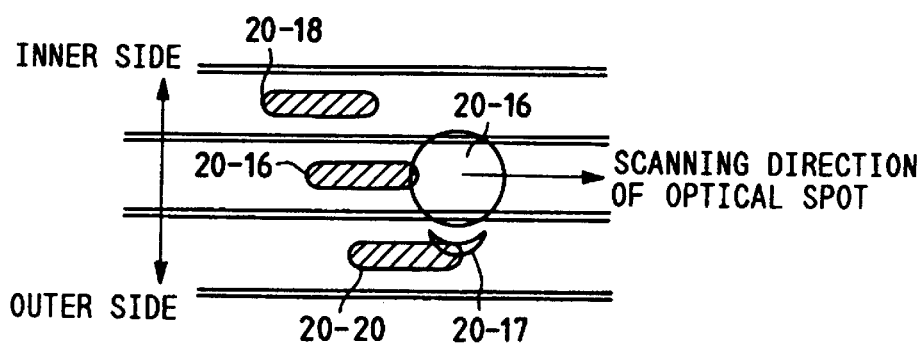
Fig. 20b-2 READING SIGNAL WAVEFORM
TAP COEFFICIENT : C(-1) > C(+1)

METHOD FOR RECORDING AND READING AN OPTICAL DISK

This is a division of application Ser. No. 08/220,428, filed Mar. 30, 1994 now U.S. Pat. No. 5,703,855.

BACKGROUND OF THE INVENTION

There are increasing needs for high density and large capacity file memories in correspondence with recent process of the high level informationalized society. A great deal of attention is attracted to optical recording in response to them and research and development have be conducted by many research organizations. Among them, overwriting magneto-optical disks have been put to practical use recently and used for document files and image files. Since first generation magneto-optical disks were put to practical use, they have been studied for improvement of performance and third generation write once type optical disks also have been studied for improvement of performance at the same time. One of the improvements is to realize a large capacity recording capacity. To increase the recording capacity, means such as 1) reducing the track pitch, 2) recording the mark edge, 3) reducing the bit pitch, 4) contriving the modulation method, 5) using a laser beam with a short wave length, and 6) using the MCAV method have been proposed. When data is recorded, read, and erased by using these means, it is important that a recorded mark in the same shape is always obtained under any recording condition. One of the prior arts which has studied this respect is indicated in Japanese Patent Application Laid-Open No. 3-22223. In this prior art, a method for changing a recording code train of a recorded mark to a pulse and forming a series of pulse trains corresponding to the length of the recording code train, for controlling the length and amplitude of the pulse train in accordance with the length of the opposite phase of the recording code train located immediately before the recording code train, for dividing the pulse train into three parts, and for changing and recording the pulse width of each pulse is used.

Furthermore, regarding magneto-optical recording, for recording on a disk by a magneto-optical recording system, magnetization for giving a binary code to the magneto-optical disk is given from an external magnetic field, and a spot of laser beam in a diameter of about 1 $\mu$m is directed on it so as to heat the area partially, and the binary code is recorded definitely.

There are two data recording methods by an optical spot directed on binary code data available, such as an inter-mark recording method and a mark edge recording method. For data of 010010, for example, the former method gives a mark onto the center of each data of 1 by an optical spot and sets data of 0 between the two marks corresponding to the two ones (1s). The latter method turns on a mark by an optical spot at the center of the one (1) which arrives first, turns the mark off when the next one (1) arrives, and turns the mark on when the next one (1) arrives furthermore. Namely, data of 0 is set between the two edges of the mark when the mark is turned on and off.

Major development items of recording on a disk by a magneto-optical recording system are to increase the recording capacity more and to allow overwriting so as to increase the data transfer rate.

The aforementioned mark edge recording method has an advantage that a memory can be more highly densified than the inter-mark recording method because the mark edges are used. On the other hand, however, it is necessary for this method to control the length and width of the recording magnetic domain with high precision and to control the length and width of a recording magnetic domain which is formed also by a change in the ambient temperature with high precision.

On the other hand, in an optical disk apparatus which performs optical information recording and reading, the reading system records and reads a minute information mark with a diameter of about 1 micron by focusing the light beam of a semiconductor laser by the object lens and by controlling the focus on a recording medium across a transparent substrate with high precision. Therefore, for example, as described in Shigeo Kubota, "An Analysis of Eye Diagram Phase Jitter in Optical Disk System V"; Optics, Vol. 14, No. 4, October 1985, a phenomenon that the waveform of a reading signal is distorted due to the aberration of the optical system and the changing point (edge) of the reading signal is shifted (edge shift) back or forth in the time axis to the original changing point of recorded data from 0 to 1 or from 1 to 0 is caused. This may cause a detection error in an optical disk apparatus for giving information to the changing point of a reading signal. This edge shift becomes particularly great when an information mark which is recorded in high density is read, accordingly the range (tolerance) of variations for the aberration which is admitted for the optical system constituting the optical head becomes severe.

As described also in the aforementioned prior art, a spherical aberration, astigmatic aberration, coma aberration, and defocusing are typical aberrations which come into question in an optical disk apparatus. Among them, the three aberrations except the coma aberration mainly depend on a variation at the time of assembly of the optical head and an electrical offset value generated in the servo circuit for focusing. On the other hand, the coma aberration is generated when a light beam passing through the disk substrate is refracted on the substrate due to the relative tilt between the object lens and disk substrate and the optical path length is changed by it and greatly depends on the mechanical accuracy of the optical head and disk.

As to the mechanical accuracy of disk substrates, as explained in the item of Background Art of Japanese Patent Application Laid-Open No. 60-231930, in substrate materials which are often used generally because they can be fabricated easily such as polycarbonate resin and acrylic resin, molded disks are easily deformed or warped. Therefore, each disk is apt to warp like an umbrella in the neighboring area to the periphery and a tilt is generated between the disk and optical head. This is defined as a radial tilt and the coma aberration which is generated at this time is called a radial coma.

To fix the disk substrate to the rotary motor so that it can be removed, a method for making a concentric hole in the center of the substrate, attaching metallic members to the front and rear sides of the disk so that the disk is held between them, installing a receiver with a permanent magnet fixed to the rotary shaft of the motor, and fixing the above metallic members by the magnetic force is often used. In this case, the reference plane of the optical disk varies with each optical disk depending on the mounting accuracy of the metallic members. Furthermore, a tilt of the optical disk in the radial direction is generated depending on the initial adjustment accuracy when the optical head is mounted. This phenomenon is called a tangential coma for the aforementioned radial coma.

As mentioned above, in an optical disk apparatus having an advantage of compatibility of an optical disk, the parallelism of an optical disk when it is mounted varies with each optical disk in principle and even if the tilt of the optical head is adjusted strictly before shipment, an occurrence of a coma aberration cannot be prevented perfectly.

The reading apparatus for an optical recording disk which is proposed in Japanese Patent Application Laid-Open No. 60-231930 as a prior art uses a method for adjusting the tilt of the object lens by detecting the tilt angle of the optical disk so as to reduce the leak (crosstalk) of a signal from the information mark on a neighboring track due to the radial coma. The prior art on removal of a tangential coma which is indicated, for example, in Japanese Patent Application Laid-Open No. 60-214463 is effective to reducing the interference between the front and rear neighboring information marks (interference between codes) in the track scanning direction.

On the other hand, many means for removing the inter-code interference and crosstalk mentioned above by signal processing have been proposed. Particularly, a means for removing inter-code interference generated between the front and rear neighboring information marks in the track scanning direction by waveform equalization is widely used in the fields of communication and magnetic recording and it has been applied also to an optical disk apparatus recently as a realization means in high density recording. As mentioned above, since it is necessary for the optical disk apparatus to reserve compatibility of an optical disk, it is desirable that the optical disk apparatus is of an automatic equalization type for operating adaptively according to the status of an optical spot. A prior art relating to it is indicated, for example, in Japanese Patent Application Laid Open No. 2-170613. It is a transversal filter type equalizer which has a tap coefficient setting circuit which can be set digitally and consists of delay lines with a tap. An output signal after equalization is binary-coded by two decision levels such as the detection level of equalization signal and data identification level. The equalizer decides the update directions (increasing or decreasing) of the tap coefficient and detection level of equalization signal on the basis of a combination of digital data of 0 and 1 and updates them sequentially. By using this means, an automatic equalizer having a comparatively simple circuit configuration can be realized also for high transfer rate data.

According to the aforementioned prior art, in recording by the mark edge recording method, sufficient consideration is not always given to changes in the recording sensitivity for recording media due to changes in the thickness of each layer of the recording media of a disk and due to changes in the ambient temperature and to an occurrence of edge shifts on the basis thereof or edge shifts due to changes in the servo system. For example, the highly precise recording mark shape necessary to super high density optical recording may not be controlled.

Furthermore, in the coma aberration removal means of the prior art mentioned above in the reading system, a means for detecting the relative tilt angle between the optical disk surface and optical head and adjusting it to almost zero (0) does not suppress the waveform distortion itself of a reading signal which is caused by a coma aberration, so that the accuracy is not high and it is difficult to suppress the effect of coma aberration sufficiently. On the other hand, a means for removing the waveform distortion caused by a coma aberration by an equalizer requires a sufficiently large number of taps and has disadvantages such as an increase in the circuit scale and an increase in the power consumption which is caused by it. When they are corrected by an automatic equalization circuit in a scale which can be realized as a product, although the compatibility of an optical disk can be reserved, the remaining waveform distortion is increased due to an increase in the coma aberration.

SUMMARY OF THE INVENTION

For the aforementioned problem of high density and as an object for recording, firstly, an object of the present invention is to provide super high density optical recording by suppressing changes in the recording mark shape due to changes in the above recording sensitivity and edge shifts inasmuch as is possible and by providing a highly precise recording mark shape control method. Another object of the present invention is to improve the matching between a recording and reading apparatus and recording medium and to suppress changes in the recording sensitivity caused by the recording and reading apparatus and edge shifts. Furthermore, another object of the present invention is to improve the reliability, storage capacity, and information transfer rate of the recording and reading apparatus.

Furthermore, as an object for reading, another object of the present invention is to eliminate the difficulties of the prior arts mentioned above and to provide an optical information recording and reading method for effectively removing the waveform distortion of a reading signal which is caused by a coma aberration generated by the tilt between an optical disk and optical head in the optical information recording and reading apparatus such as an optical disk apparatus on condition of compatibility of the optical disk and an apparatus for executing the method.

A further object of the present invention is to realize super high density optical recording at a rate of 1.5 $Gb/in^2$ min. and to provide an optical recording and reading apparatus by using the above mentioned.

As actual means for realizing the above objects, there are two means available as roughly divided, such as 1) the recording system and 2) the reading system. Namely, by proposing a method for recording with high precision and reading the recorded information stably, both systems are well balanced and super high density optical recording is realized. Firstly, the art for recording will be described.

What is important for recording so as to realize the above objects is matching between the recording and reading apparatus and recording media. Particularly, since an optical disk is an exchangeable medium, variations in a recording and reading apparatus and variations in a recording medium may be obstacles in reservation of compatibility. Particularly, to realize high density recording, it is necessary to minimize these variations inasmuch as is possible. However, there is a limit to it. Therefore, to absorb those variations, before recording user data, pre-write testing is conducted at a fixed location of a disk, and a reading signal obtained by the pre-write testing is compared with the pre-write testing pattern data, and the user data is recorded after the difference becomes lower than a fixed value. The object for conducting this pre-write testing is to detect and suppress changes in the recording sensitivity for a recording medium due to changes in the thickness of each layer of the recording medium of a disk by the mark edge recording method and changes in the ambient temperature, or changes in the laser power of the recording and reading apparatus, furthermore edge shifts according to them or edge shifts generated by changes in the servo system. Changes in the servo system are changes in the focus and track mislocation and cause edge shifts. In addition, in consideration of that an optical disk is an exchangeable medium, edge shifts are generated also by an aberration generated in the process of assembly of the optical head. In consideration of compatibility between recording and reading apparatuses, it is necessary to suppress the aberration to less than a fixed value. Simultaneously with it, the aberration can be corrected by setting to a fixed value independently of a pattern in which the waveform tilt of a reading signal at the front edge or rear edge is recorded by using an equalizer.

In optical recording for recording, reading, or erasing at least using a laser beam, to conduct pre-write testing prior to recording user data, it is desirable to set the laser power to a fixed value, to conduct the pre-write testing by increasing or decreasing the pulse width for pre-write testing against a reference set value, to read and take statistics of the result, and to set user data recording conditions on the basis of the obtained result. By changing and recording the pulse width of micropulses constituting the recording waveform to be used for the pre-write testing and user data recording mentioned above at a fixed time interval centering on the standard set value in the pre-write testing, most suitable recording conditions in which a match exists between the recording medium and recording and reading apparatus can be decided. It is desirable to record on an optical disk by using a recording waveform consisting of an aggregate of micropulses in which the width of the leading pulse is set wider than the width of other pulses and the width of the trailing pulse and the interval between pulses are made equal respectively as a recording waveform to be used for this pre-write testing and user data recording. Furthermore, in the recording waveform to be used for this pre-write testing and user data recording, the set power level consists of at least four power levels, and the lowest level among the levels is a read level, and the next level is a pre-heat level, and the remaining two levels are record levels, and furthermore each power level is assigned a role. The read level is used to read and verify the recorded information, and the pre-heat level is used to supply power for providing thermal balance so as to keep the recording medium temperature constant between pulses, and the record levels are used to record information on a disk. The two record levels in the recording waveform to be used for this pre-write testing and user data recording are set so that thermal balance is provided between the leading pulse and the subsequent pulses and the recording layer temperature is kept constant independently of the pattern. When the thermal balance is to be provided, a method for controlling by the pulse width (time) greatly affects the controllability compared with a method for controlling by the laser power, so that it is effective as a recorded domain shape control method. In the recording waveform to be used for pre-write testing and user data recording, the ratio of the first record level or second record level to the pre-heat level and the ratio of the first record level to the second record level are set depending on the disk layer structure or material to be used as a recording medium. Therefore, needless to say, the first record level may be set equal to the second record level. The reason is that the heat flowing way in the medium varies with the medium structure and material to be used. In the recording waveform to be used for pre-write testing and user data recording, by moving to the pre-heat level for a given period after irradiating the recording pulse and then keeping the read level for a given period and entering the recording area again, thermal interference between the recording patterns can be eliminated. In the recording waveform to be used for pre-write testing and user data recording, the time of the read level and pre-heat level for a given period after the recording pulse is irradiated is a period in synchronization with the write clock. The reason is that a high precision clock can be generated and the manufacturing method of the apparatus is good. In pre-write testing, it is desirable to control so as to always record a recorded domain in the same shape on an optical disk not by changes in the recording conditions by recording a fixed pattern on the test track, reading it, and taking statistics of the result and by detecting changes in the recording conditions such as changes in the laser power and focus, track mislocation, or changes in the ambient temperature and changing and recording changes in the pulse width of each micropulse in the recording waveform consisting of micropulses on the basis of the above detection results. In recording information, when a so-called mark edge recording method for recording information at the edge of a mark which is formed for information recording is used, it is particularly effective. In pre-write testing, by recording repetition of the shortest pattern and pulse interval and repetition of the longest pattern and shortest pulse interval alternately in the modulation method for changing and recording a fixed pattern on the test track at a fixed rate centering on the reference pulse width without the set power being changed, for reading it, and for using it for recording as a pattern to be used and detecting the difference in voltage at the centers of the signal amplitudes of both patterns when it is read and by detecting changes in the recording conditions and detecting the pulse width when the potential difference becomes zero, a domain in the same shape can be obtained without depending on the recording conditions. Needless to say, it is necessary to conduct this pre-write testing before starting recording. Since it is pre-write testing for detecting the most suitable recording conditions, it is unknown when a recording or deleting instruction will be sent. Therefore, it is efficient in time to conduct pre-write testing at a fixed time interval. It is desirable to use the so-called zoned (ZCAV) method for dividing an optical disk into a plurality of zones and recording so that the recording density becomes equal at any location at least in each zone under the most suitable recording conditions detected by the pre-write testing. To conduct pre-write testing so as to detect the most suitable conditions, it is desirable to divide a disk into a plurality of zones, to conduct the pre-write testing in a fixed area in each zone, and to record user information. It is necessary to preset this test area.

It is effective to use the pre-write testing method together so as to improve the controllability of recording magnetic domain shape control using a recording waveform using a multi-pulse. Furthermore, when this method is used, the present invention functions effectively so as to control changes in the use environmental conditions accurately and also changes in the recording sensitivity depending on the location such as the inner periphery and outer periphery and variations in the sensitivity between disks and to reserve compatibility between disks with a different layer structure. Particularly, to realize super high density recording, delicate magnetic domain shape control is necessary and the pulse width control of the present invention contributes more greatly to improvement of the controllability than a case for controlling the recording conditions by changing the laser power. Particularly, optical magnetic recording which is sensitive to temperature requires specially precise control and the present invention is particularly effective in realization of the object.

Recording systems of general optical disks are described above. Actual recording systems which are most suitable for application of the present invention are those of magneto-optical disks and write once type optical disks. Each of them will be described hereunder.

To accomplish the above objects, the recording control method for a magneto-optical disk, for example, as shown in FIG. 1, overlaps a plurality of types of square waves on a reading level Pr (shown in FIG. 1(b)) of a laser beam output at a fixed level which are synchronized with a clock pulse 1-30 with a period of T and are a time length of "integer times of ½ T±uniformly adjusted pulse length", controls the laser beam output as shown below, that is, for example, as shown in FIG. 1(b), and records it at a predetermined level corresponding to a recording code train 1-20.

Namely (1) within the recording code time of the above recording code train 1-20, there is a pulse train consisting of at least one type of square wave pulse with a period length of "integer times of ½ T±uniformly adjusted pulse length" which rises or falls in synchronization with the rise or fall of the above recording code together with the clock pulse 1-30 and reaches the record level Pw (Pr<Pw) within the period.

(2) during the rest time between the recording codes of the above recording code train 1-20, the pulse train falls to the above reading level Pr in synchronization together with the clock pulse 1-30, is kept for the period of integer times of ½ T in the above reading level state, rises to the pre-heat level Ph (Pr<Ph<Pw) or the erase level Per (Pr<Per<Pw), and holds the level up to the point of time when the next recording code rises; and (3) According to the recording code time of the above recording code train or the rest time between the recording codes, the number of pulse trains of Pw in Item (1) is changed or the holding time length of Pr in Item (2) is changed.

Assuming that the above square wave pulse is set on the base level of the above pre-heat level Ph or erase level Per, for example, as shown in FIG. 1(b), it is desirable to control the laser beam output on the same base level in principle together with the rest time.

Or in these cases, assuming the above pulse train configuration as, for example, a pulse train configuration as shown in FIG. 1(b) which consists of a leading pulse with a level of Pw and a pulse width of "integer times of ½ T±uniformly adjusted pulse length" and at least one rear pulse with a level of Pw and a pulse width of "½ T±uniformly adjusted pulse length", the pulse train is raised early by the leading pulse and can be controlled with high precision preferably. In this case, the relation between the record level area Pw and the uniformly adjusted pulse length depends on characteristics of a medium to be irradiated by a laser beam.

That there is one type of square wave pulse within the recording code time means that the widths and levels of square wave pulses within the time are the same respectively. Therefore, that there are a plurality of types of square wave pulses means that there are square wave pulses which are different in at least one of pulse width and level in the pulse train. That there are different pulse intervals in both cases will cause no problems in the above pulse type.

Furthermore, for example, as shown in FIG. 1(b), all the square wave pulses of the laser beam output rise or fall in synchronization with the clock pulse 1-30 and the pulse length and gap length are adjusted uniformly, so that the pulse widths and intervals of all the square wave pulses and the above holding time of the fixed level are "integer times of ½ T±uniformly adjusted pulse length". The above integer of integer times is a number which is selected in accordance with the time length of the waveform at each point of time among the natural numbers 1, 2, 3, - - - and the same number is not always used in accordance with the use location.

The relative sizes of the above pre-heat level Ph and erase level Per depend on characteristics of a medium to be irradiated by a laser beam and are not decided uniquely. They will be referred to as just a recording auxiliary pulse Pas representatively hereinafter.

According to the present invention, in a recording control method for a magneto-optical disk for irradiating a laser beam of the first output level Pas onto a recording medium to which an external magnetic field is applied, for example, as shown in FIG. 1(b) so as to raise the temperature of the above recording medium beforehand, for irradiating a laser beam of the second output level Pw so as to raise the temperature of the recording layer held by the above recording medium more than the Curie temperature of the above recording layer, for irradiating a laser beam of the third output level Pr so as to lower the temperature of the above recording layer less than the Curie temperature, and for forming recording domains continuously on the above recording medium, the irradiation time of the above laser beam of the second output level Pw or the irradiation time of the above laser beam of the third output level Pr is made variable.

It is desirable to change the irradiation time of the above laser beam of the third output level Pr in accordance with the interval of neighboring recording domains among the above continuous recording domains.

Or, it is desirable to change the irradiation time of the above laser beam of the second output level Pw in accordance with the length of each aforementioned recording domain.

As mentioned above, spot irradiation of a laser beam to a magneto-optical disk acts so as to decide magnetization of a part of the disk by raising the temperature of the part up to a predetermined recording temperature zone by an optical output which is intensive enough to reach the record level area. By doing this, even if the laser beam is removed, the magnetization in a predetermined direction is held. Namely, data can be recorded.

As mentioned above, since data is recorded by such a laser beam via a temperature rise on the disk, it is necessary to control the temperature distribution on the disk with high precision and it is generally difficult. For example, the waveform during the recording code time when a mark edge waveform is used is a square wave as shown in the recording code train waveform in FIG. 1(a). When the laser beam at the level in the recording area is irradiated to the disk in the waveform of this square wave, the temperature of the corresponding part of the disk is accumulated and raised successively within the square wave time and it is difficult to keep the temperature at a fixed level. On the other hand, the temperature lowers exponentially at the end point of the recording code time and when the next recording code time comes before the temperature lowers fully, the temperature of a laser beam which is newly irradiated and the previous remaining temperature are added. As a result, the constancy of temperature cannot be kept within the recording code time and rest time respectively and an error may be caused.

The present invention controls the laser power so as to keep the above constancy of temperature simply by using a combination of square wave pulses synchronizing with the clock. All the pulses synchronize with the clock and the pulse level can be controlled easily by using a plurality of but few pulses. Therefore, no specific apparatus is required. Namely:

(1) When it consists of a pulse train including at least one type of square wave pulse which rises or falls in synchronization with the rise or fall of the above recording code together with the clock and reaches the recording level area Pw (Pr<Pw) within the time during the recording code time of the recording code train, it is possible to raise the temperature by the pulses at the first half part of the recording code time and to keep the temperature almost constant by the pulses at the second half part. In this case, when there is only one type of square wave pulse with a pulse width of "½ T±uniformly adjusted pulse length", at the second half part, the temperature rise can be suppressed within a predetermined range by including pulses with a pulse width of integer times of ½ T within the rest time between the pulses. Furthermore, by using at least two types of pulses with a different pulse width and level in synchronization with the clock, raising the temperature by one of pulses, and suppressing the temperature rise by the other, the temperature can be kept almost constant more easily. However, since the temperature rise of the part of the disk by irradiation of a laser beam depends on the medium characteristics, to raise the temperature to a predetermined temperature level with high precision, it is necessary to select how to give pulses in correspondence with the medium characteristics.

(2) In the rest time between the recording codes of the recording code train, the laser power falls to the lowest reading level Pr in synchronization together with the clock and the temperature fall from the temperature level during recording is speeded up. When the laser power is kept in the lowest level state temporarily (during the time of integer times of ½ T), and the level of the laser beam is raised to the pre-heat level Ph or the erase level Per which does not reach the record level before the next recording code rises, and the level is kept, by adding a laser power at the pre-heat level Ph or the erase level Per so as to raise the temperature though the temperature lowers within the lowest level time of the laser beam, the temperature within the above rest time can be corrected so as to be made constant early.

(3) Since the length of the recording code time of the recording code train or of the rest time between the recording codes varies with data to be recorded, by changing, for example, the number of pulses of the pulse train of Pw in Item (1) mentioned above according to the size thereof or by changing the holding time length in Item (2) mentioned above, the temperature can be made constant.

To make the temperature constant, the present invention uses pulses synchronizing with the clock, so that the pulse width, pulse interval, and fixed level holding time are all limited to "integer times of ½ T±uniformly adjusted pulse length" and by using a pulse level having little recording, reading, or erasing, no special apparatus is necessary and easy control is available. A method of the present invention that a pulse reaching the recording level area Pw is overlapped on the erase level Per and recorded can be applied to overwriting.

As mentioned above, according to the present invention, recording can be made highly precise simply though the mark edge recording method is used. Therefore, recording can be made in high density easily.

Next, the art of the recording system for a write once type optical disk will be described.

When causes of generating changes in the recording domain size of a write once type optical disk are analyzed, the main cause is a change in the laser power. The reason is that since the temperature of the recording layer during recording is extremely high such as 400° to 500° C., the effect of the temperature rise of the recording layer during recording due to changes in the room temperature on the recording domain size can be ignored. Therefore, by performing an operation for detecting changes in the laser power when a write once type optical disk is loaded or when the apparatus is started so as to record the disk, the recording domain size can be suppressed in changing. More concretely, in optical recording for recording or reading by using at least a laser beam, by performing test recording on a disk using a fixed pattern when the disk is loaded or immediately before information is recorded on the disk, reading the test-recorded data, taking statistics of the result, and controlling the power of the laser beam source to be used by using the result, a recording domain with the same size can be formed always without being affected by changes in the recording conditions. Or, in optical recording for recording or reading by using at least a laser beam, by recording a fixed reference pattern signal in a fixed area of the disk beforehand, performing test recording on a disk using a fixed pattern when the disk is loaded or immediately before information is recorded on the disk, reading the test-recorded data, taking statistics of the result, and obtaining a most suitable power by comparing the result with the previously recorded signal, a recording domain with the same size can be formed always without being affected by changes in the recording conditions. It is necessary that the width or length of a recording domain which is formed as a fixed reference pattern signal to be recorded in a fixed area of a disk beforehand is different from each other. A case that the mark edge recording method is used to record information of a fixed pattern on a disk is most suitable. As a disk to be used to record information, there is a write once type optical disk on which a user can record information only once available. To record information, it is desirable to record it so that the information recording density is the same at any location of a disk and more preferable to record it under the condition that the disk is divided into a plurality of zones and the recording conditions are set in each zone. Furthermore, to perform test recording on a disk, needless to say, it is desirable to set a test area in each zone, perform test recording in the test area in at least one zone among them, detect the laser power by analyzing the result, and optimize the recording conditions. It is desirable to perform statistical processing as an analytical means of the result. It is desirable to perform test recording on a disk when the disk driver is started or the disk is loaded in the driver. In a recording domain to be formed so as to record data on a disk, it is desirable that the length of the domain to be formed in the radial direction of the disk is made constant independently of the length of the domain in the rotational direction of the disk. In this case, a write once type optical disk is used and as an information recording method, it is desirable to record information by using the reflective index of the recording layer and more preferably by using a means for recording the changes in the reflective index by using at least one type of method selected from changes in the crystal status of the recording layer, changes in the refractive index, changes in the light absorption coefficient of the wave length of light to be used for reading, forming of an alloy part, forming of a light diffused reflection layer, and forming of a lost part of the recording layer. As recording patterns to be used for performing test recording on a disk, it is desirable to use patterns including at least a longest pattern and shortest pattern in the modulation method to be used. In this case, it is not an object to detect thermal interactions between recording domains but it is an object to detect changes in the domain size. As recording patterns to be used for performing test recording on a disk, it is desirable to use patterns including at least a longest pattern and shortest pattern in the modulation method to be used and more preferably to detect a most suitable laser power by recording the patterns by using a different laser power. As a recording laser power to be used for performing test recording on a disk, it is desirable to record the recording lower power or pulse width under conditions that it is increased or decreased compared with the standard conditions centering on the standard recording conditions which are recorded on the disk or in the memory of the disk driver. In this case, it is desirable to obtain a recording laser power by which a fixed reading signal output can be obtained. To perform test recording on a disk and detect changes in the laser power, it is desirable to detect the difference between the central values of the amplitudes of at least a longest pattern and a shortest pattern signal in the modulation method to be used and to control the shape of recording domain by controlling the recording laser power so as to minimize the shift amount between the central values as a most suitable recording laser power. In this case, the recorded information is demodulated by reading the information recorded on the disk as a digital electric signal, binary-coding the obtained reading signal by slicing at a fixed level, and more preferably obtaining and reading the central value of the amplitude of the signal of which the slicing level is obtained.

Generally no data can be overwritten on a write once type optical disk, so that when test recording is performed, the recording area is reduced. However, by devising patterns to be used for test recording such as recording all patterns that the test recording area is recorded in a sector by changing the power, the number of bytes to be used can be saved. Furthermore, there is no need to perform test recording for each recording prior to recording and it is desirable to perform test recording only when a disk drive in which the laser beam may be changed is started or a disk is loaded. About 50 bytes are required for normal test recording and the test recording count on a disk may be about $10^5$. The capacity required for it is 70 MB and the capacity which can be recorded by the present invention is between 7 and 10 GB, that is, it is less than 1% and a sufficiently tolerable value.

As a result, by performing test recording prior to recording of user information, finding changes in the recording conditions by detecting changes in the recording magnetic domain to be formed, and correcting them, a recording domain in the same shape can be formed always. By doing this, even under any environmental conditions or even if a different recording and reading apparatus or recording medium is used, by performing the test recording of the present invention, a shift from the standard recording conditions can be detected. Therefore, by controlling the recording conditions on the basis of the detection result, edge shifts and jitter changes on the basis of the environmental conditions under which the system is installed and changes in the recording sensitivity due to differences in the apparatus and medium can be suppressed.

By performing test recording by the above means when the disk driver is started or a disk is loaded before recording user information, the user information can be recorded by a most suitable laser power and a recording domain in the same size can be formed always, so that high density recording can be realized. In the case of a write once type optical disk, the recording area is reduced every test recording. However, since test recording is executed only when the disk driver is started or the disk is loaded, the area to be used for it is a little and a small amount compared with the entire recording capacity.

Next, the reading system necessary for high density recording will be described. To accomplish the aforementioned objects, by reading the area where a special recording pattern is recorded when an optical disk is loaded for recording and reading optical information, obtaining a most suitable tap coefficient by an automatic equalizer consisting of a transversal filter of at least three taps, obtaining an error signal in proportion to the relative tilt between the optical disk surface and optical head on the basis of the above value, mechanically adjusting the tilt of the optical head so that the error signal becomes almost zero (0), and removing the waveform distortion of a reading signal which is generated by a coma aberration generated by the tilt between the optical disk and optical head or furthermore in addition to the above waveform distortion removal processing when the optical disk is loaded, by finely adjusting the above tap coefficient so as to remove the waveform distortion remaining in the reading signal by using the aforementioned equalizer even when recorded data is read, the distortion of waveform of a reading signal generated by a coma aberration generated by the tilt between the optical disk and optical head can be removed effectively.

The optical information recording and reading apparatus of the present invention includes at least an optical disk which is an optical recording medium which can be loaded or unloaded and an optical head for reading information recorded on the above optical disk and has a signal processing means for removing the distortion of waveform of a reading signal from the above optical head, a means for obtaining information on the tilt between the above optical disk and optical head in the peripheral direction or in the radial direction or in both directions from the above signal processing means, and a means for mechanically correcting the tilt between the above optical disk and optical head from the above tilt information.

The signal processing means for removing the distortion of waveform of a reading signal from the above optical head is a means for equalizing output signals from the optical head and has an equalization means for calculating the tilt between the optical head and optical disk from the equalization characteristics optimized by using a means for controlling the equalization characteristics adaptively for the above equalization means.

The present invention has a circuit for removing almost the tilt between the above optical disk surface and optical head before recording or reading information by the optical head and removing the distortion of waveform due to the remaining tilt by the equalization means for calculating the tilt between the optical head and optical disk from the optimized equalization characteristics. The equalization means for calculating the tilt between the optical head and optical disk from the above optimized equalization characteristics includes a circuit consisting of a transversal filter having at least three taps.

When there is a tilt between the optical disk and optical head, a distortion of waveform which is asymmetric in the longitudinal direction is generated in a reading signal by a coma aberration. When the reading signal is automatically equalized, one of the first and third tap coefficients is converged to a large value in accordance with the asymmetry of the distortion of waveform in the longitudinal direction. By adjusting the tilt of the head so that these tap coefficients become equal to each other, the tilt between the optical disk and optical head is removed almost. Since this operation is performed only once when the optical disk is loaded, there is no wait for reading of recorded data. When recorded data is read, by adjusting the tap coefficient finely so as to remove the distortion of waveform of the reading signal which cannot be removed fully only by adjustment of the tilt of the optical head by using the same automatic equalizer, highly accurate correction is possible including an effect of a slight coma aberration caused by upper or lower contact of the optical disk.

As an effect obtained by the above art, even if the use environmental conditions of the recording and reading apparatus and recording media are changed, by performing test recording, data can be recorded on a disk always under the optimum conditions (a magnetic domain in the same shape can be formed with high precision). Even if the disk layer structure is different (the disk recording conditions are different), by performing test recording, data can be recorded on a disk always under the optimum conditions (a magnetic domain in the same shape can be formed with high precision). Particularly, by controlling the pulse width of recording pulses so as to decide the optimum recording conditions from the result of test recording, fine adjustment is made possible and the control precision for the recording magnetic domain to be formed can be improved greatly. As a result, changes in the use environment and changes in the recording conditions due to differences in the disk structure can be canceled, so that a minute magnetic domain can be recorded on a disk stably and in the same size and accordingly super high density magneto-optical recording or super high density write once type optical recording can be realized.

In a write once type optical disk, even if the recording conditions such as the laser power are changed, by performing test recording and analyzing the result, a change in the power is detected and the power can be controlled on the basis of it, so that a recording domain in the same size can be formed always and accordingly high density optical recording can be realized. Furthermore, the effect of the present invention is available in a write once type optical disk and does not depend on the optical disk type, that is, needless to say, the present invention may be applied to a disk of any of the alloy type, phase change type, and bubble type.

Furthermore, by using a laser beam power for increasing or decreasing the pulse width uniformly instead of correcting it optionally and synchronizing the pulse width with the clock, the recording mark width and length which are important parameters for magnetic domain shape control can be controlled with high precision and simply. As a result, high density magneto-optical recording using the mark edge recording method can be realized easily. Since the present invention requires no new high precision pulse generation circuit, it is useful in reducing the cost of the high density magneto-optical recording apparatus.

Furthermore, in the reading system, according to the optical information recording and reading method and apparatus of the present invention, for the relative tilt between the optical disk and optical head which is caused by use of a compatible disk, the distortion of waveform of a reading signal is removed by an equalizer which is necessary for high density recording and the tilt information is obtained from the most suitable tap coefficient at this time, so that the tilt angle can be detected accurately by a few additional circuits. Furthermore, for the effect of the tilt which is generated due to the remaining tilt and upper or lower contact of the optical disk after the tilt is corrected when the optical disk is loaded, the distortion of waveform of a reading signal can be removed by automatic equalization in a shorter convergence time and with high reliability.

By combining the aforementioned recording art and reading art organically and using them, super high density optical recording of 1.5 Gb/in$^2$ can be realized.

BRIEF DESCRIPTION OF THE DRAWINGS

FIGS. 1a-1–1d-3 are drawings of an embodiment the present invention.

FIG. 2 is a schematic view of the cross sectional structure of a magneto-optical disk.

FIG. 3 is a drawing showing the structure of a recording and reading apparatus.

FIGS. 4a–4g are drawings showing the waveform used for recording.

FIGS. 20a-1–20b-2 are illustrations showing the form of waveform distortion of a reading signal generated by the tilt of the optical disk in the radial direction shown in Example 3 of the reading system of the present invention.

DESCRIPTION OF THE PREFERRED EMBODIMENTS

Firstly, an example of a recording and reading method in magneto-optical recording and of a magneto-optical disk driver using the method will be described.

Recording Example 1

Figure 2:
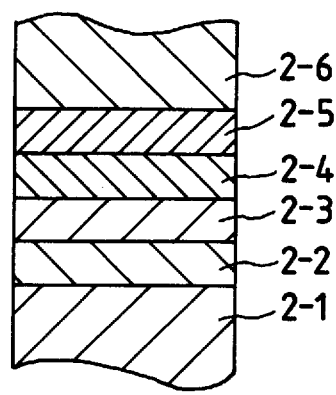

The recording and reading method and apparatus of the present invention will be explained using detailed embodiments. Firstly, a schematic view showing the cross sectional structure of the magneto-optical disk used is shown in FIG. 2. On a plastic or glass substrate 2-1 having an uneven guide groove on the surface thereof, a silicon nitride layer 2-2 is formed by the sputtering method. The layer thickness at that time is 75 nm. Next, a magneto-optical recording layer 2-3 is formed continuously in the vacuum state. The layer thickness is 25 nm. Then, a silicon nitride layer 2-4 is formed by the sputtering method again. The layer thickness at that time is 25 nm. Finally, an $Al_{98}Ti_2$ metallic layer 2-5 is formed by the sputtering method. The layer thickness at that time is 50 nm. The surface of this recording medium is coated with an ultraviolet curing resin 2-6 for protection. Two disks manufactured like this are sticked together so that the surfaces where recording media are formed are opposite to each other so as to form a single disk.

Figure 3:
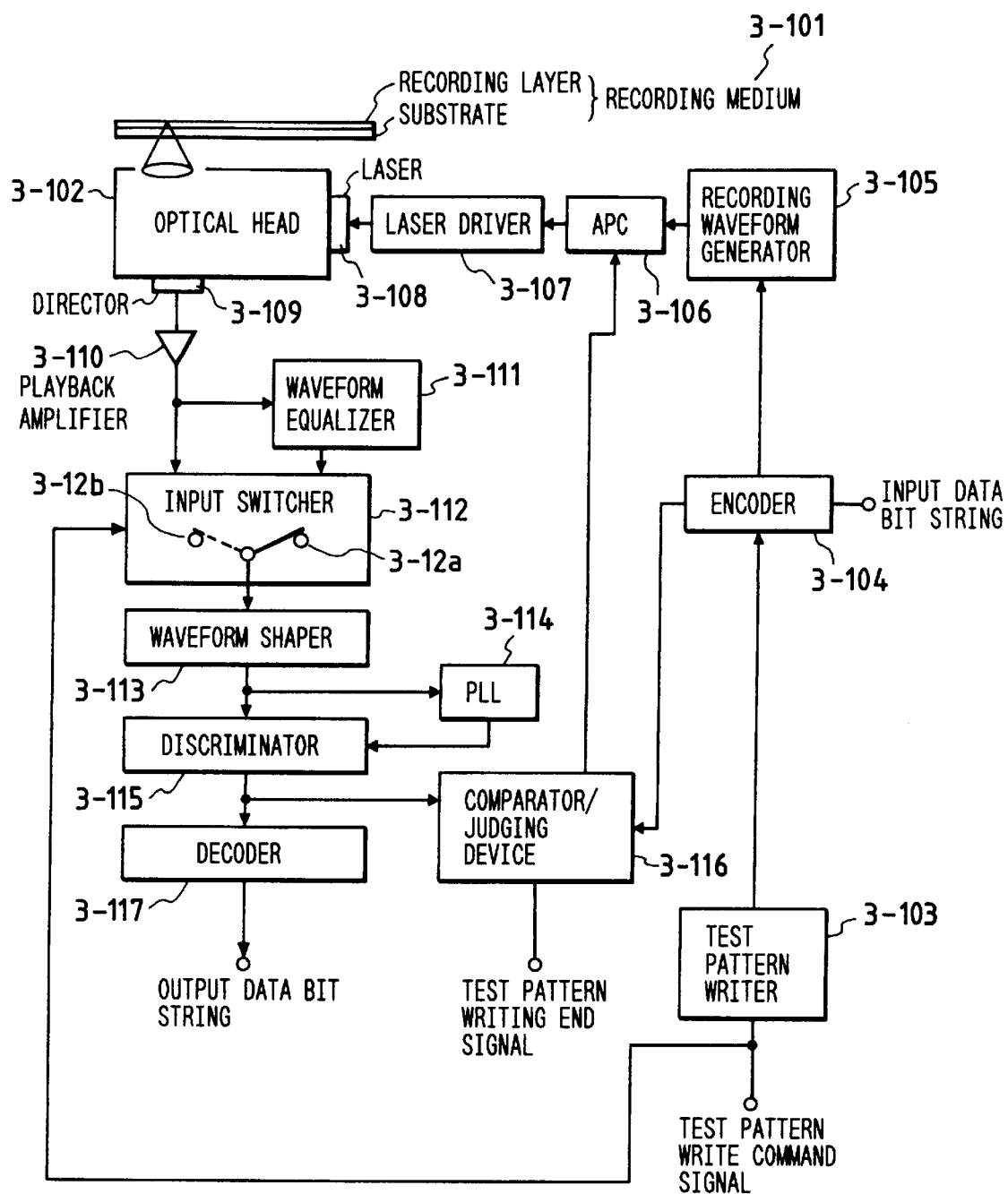

A signal is recorded on the disk manufactured like this. An outline of a recording and reading apparatus used is shown in FIG. 3. The recording and reading apparatus consists of a recording medium 3-101 for storing information, an optical head 3-102 for realizing recording and reading, and a processing system for converting a reading signal obtained from the optical head 3-102 to information. The optical head 3-102 focuses light emitted from a laser 3-108 onto the recording medium 3-101. When information is recorded, an input data bit train (information) is inputted into an encoder 3-104, and a recording code train outputted from the encoder 3-104 is led to a recording waveform generator 3-105, and the recording waveform obtained by the recording waveform generator 3-105 is inputted into an APC (auto power controller) 3-106, and the light intensity corresponding to the recording code train is outputted to the laser 3-108. When information is read, light reflected from the recording medium 3-101 is led to a director 3-109 and converted to an electric signal. The signal is inputted into a playback amplifier 3-110 and outputted to a waveform equalizer 3-111 and an input switcher 3-112. The input switcher 3-112 converts the signal to a pulse signal indicating the presence or absence of a reading signal from the playback amplifier 3-110 or the waveform equalizer 3-111 according to a test pattern writing instruction signal. The pulse signal is led to a discriminator 3-115 and a PLL (phase lock loop) 3-114. A synchronizing signal (a signal in synchronization with the basic period of the pulse signal) outputted from the PLL 3-114 is inputted into the discriminator 3-115. The discriminator 3-115 generates a detection code train from the above pulse signal and synchronizing signal and outputs a data bit train (information) by a decoder 3-117. The detection code train from the discriminator 3-115 is outputted to a comparator/judging device 3-116. The comparator/judging device 3-116 switches so that test pattern writing data from a test pattern writer 3-103 for operating by a test pattern writing instruction signal is outputted to the encoder 3-104 and the input switcher 3-112 for operating by a test pattern writing instruction signal outputs an output from the playback amplifier 3-110 to a wave shaper 3-113, compares a recording code train from the encoder 3-104 with a reading code train from the discriminator 3-115, and outputs a test pattern writing end signal when the difference of the reading code train from the recording code train becomes small to a certain extent and enters within the tolerable range. When the test pattern writing end signal is outputted, the input switcher 3-112 switches so that an output from the waveform equalizer 3-111 is sent to the waveform shaper 3-113 and starts the normal recording and reading operation. Even after the input switcher starts the normal recording operation, it lets the comparator/judging device 3-116 confirm that the difference of the reading code train from the recording code train is within the tolerable range. When the difference is not within the tolerable range, the input switcher starts the aforementioned test pattern writing operation. When the test pattern writing end signal is outputted, the input switcher continues the normal recording operation again. When the comparator/judging device 3-116 confirms the difference of the reading code train from the recording code train, by making the input switcher 3-112 output a signal from the playback amplifier 3-110, the comparator/judging device can detect the difference precisely. These operations can be realized even if the input switcher 3-112 is not used. To detect the difference of the reading code train from the recording code train precisely by the comparator/judging device 3-116, it is desirable that the waveform equalizer 3-111 is not used.

Figure 5:
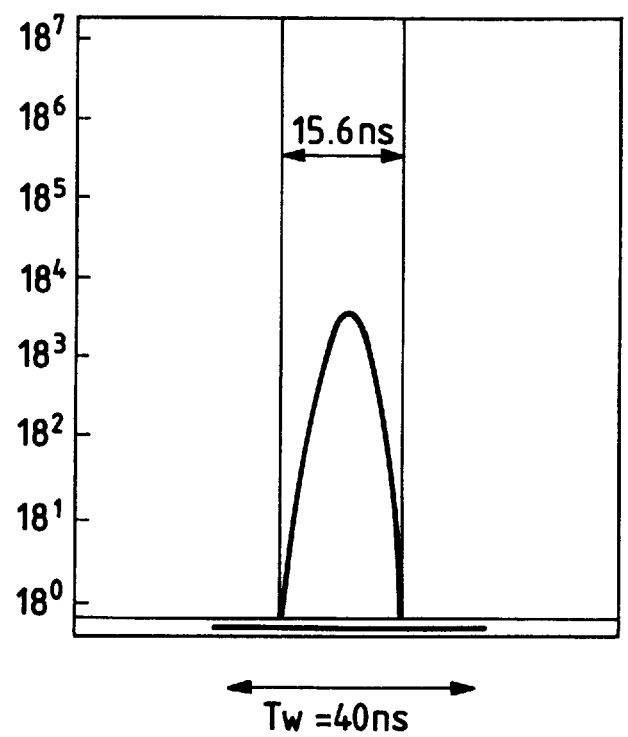
FIG. 5 is a drawing showing the jitter distribution.
Figure 6A:
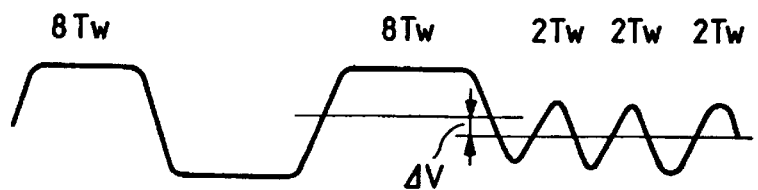
FIGS. 6a–6b are drawings showing changes of the difference of the central values of signal amplitudes of a longest pattern of modulation code and a shortest pattern of modulation code and of the pulse width.
Figure 6B:
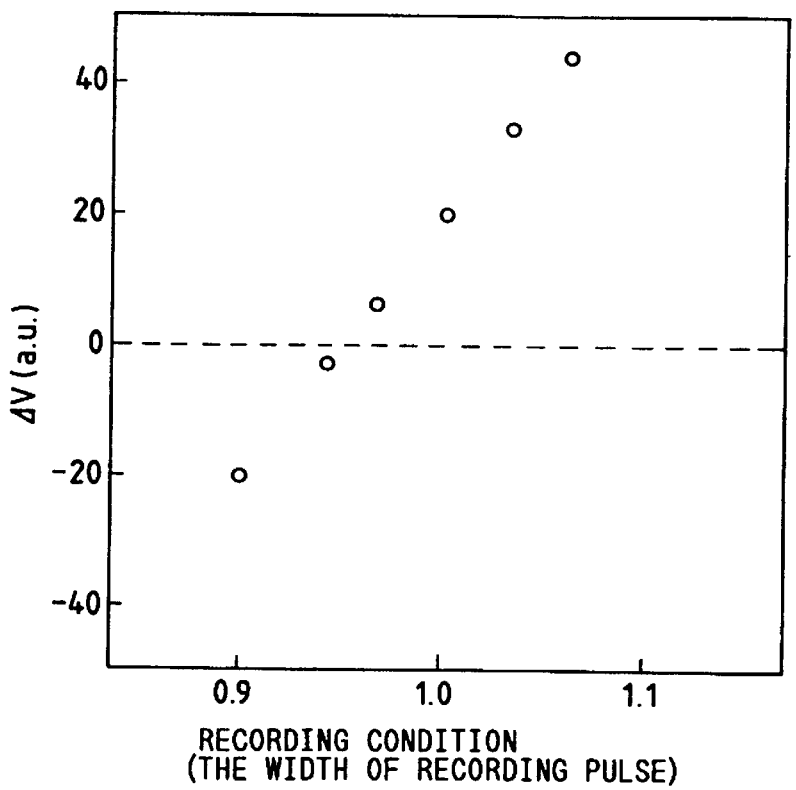
Figure 7:
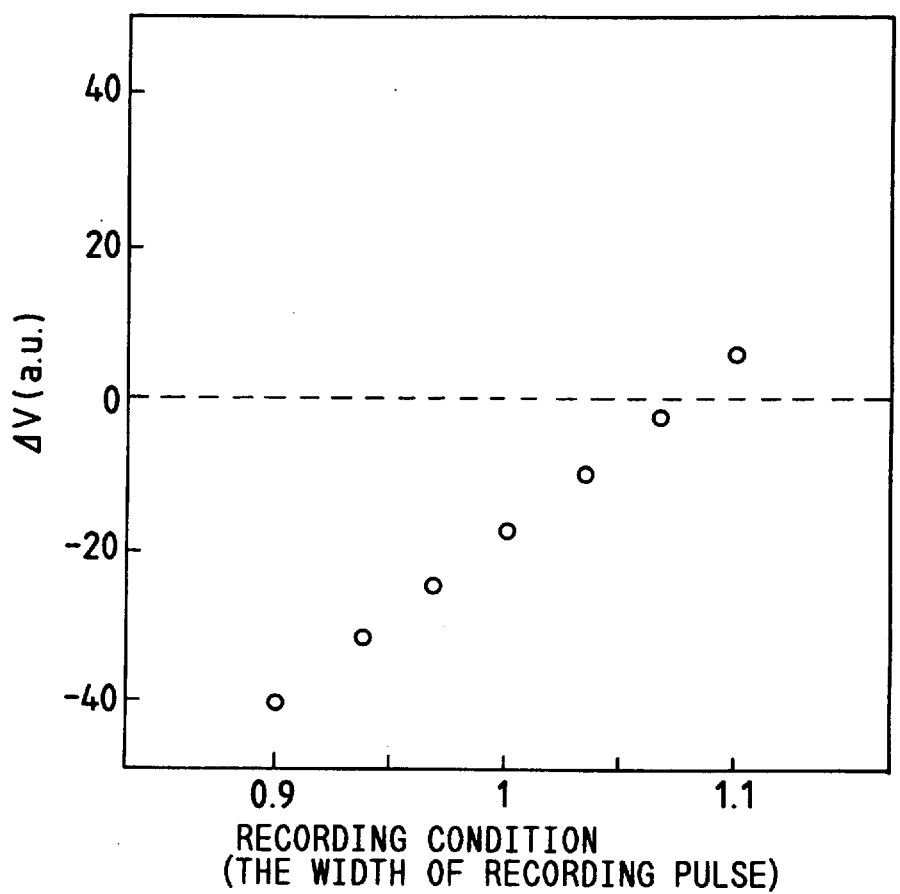
FIG. 7 is a drawing showing changes of the difference of the central values of signal amplitudes of a longest pattern of modulation code and a shortest pattern of modulation code and of the pulse width.

Data is recorded or read on or from disks using the aforementioned recording and reading apparatus and recording media. The number of revolutions of the used disks of the apparatus is 3000 rpm, and the wave length of a laser beam is 780 nm, and the modulation method is (1,7) RLL. The recording density is the same at any location of each disk. The recording waveform used for recording on each disk is shown in FIG. 4. For the laser powers used, the read level Pr is set to 1.5 mW, the pre-heat level Pas to 3.5 mW, the first record level Pw1 to 5.8 mW, and the second record level Pw2 to 6.1 mW. Each power varies with the layer structure and material of a disk. The layer structure of a disk is most effective in suppressing jitter and edge shifts caused by thermal interactions between recording domains to less than a fixed value except the material to be used. When it is evaluated by parameters of the recording and reading apparatus, it is necessary that the ratios of Pw1/Pas, Pw2/Pas, and Pw1/Pw2 are within a fixed range. When the values are measured with many disks, for disks within the ranges of $1.5<Pw1/Pas<1.7$, $1.6<Pw2/Pas<1.8$, and $0.9<Pw1/Pw2<1.1$, when the mark length is recorded, the length and width of recording domains formed can be controlled precisely. The control accuracy at that time is at most $\pm0.02\,\mu m$ in the domain length direction (the track direction of each disk) and at most $\pm0.05\,\mu m$ in the domain length direction (the radial direction of each disk). The above accuracy values are values which are obtained from measurements of jitter and edge shifts when data is read and measurements by an MFM (scan magnetic force microscope). Data is recorded or read in the zone of the innermost periphery of a 5.25" disk. Firstly, a random pattern is recorded at room temperature (20° C.) and previously set powers using the (1,7) RLL method. The jitter distribution at that time is shown in FIG. 5. This is a result when measured with no PLL formed. The result shows that the window width ratio is 39%. When the edge shift amount is measured, it can be suppressed to at most ±2 ns. When the recording and reading apparatus and media are left in an environment at 50° C., the jitter increases to 50% in window width ratio. The shift also increases greatly such as to ±10 ns. In this state, test recording is performed on this magneto-optical disk. The test pattern used is repetition of 2Tw and 8Tw. To perform test recording, changes in the difference of the central values of amplitudes of the longest pattern and shortest pattern signals when the pulse width is uniformly changed and recorded within ranges of ±3%, ±6%, and ±10% are checked. The detection result of potential difference (ΔV) between the patterns is shown in FIG. 6. When the pulse width for ΔV=0 is obtained in this drawing, the value obtained under this condition is smaller than that obtained at the room temperature by 5%. When recorded under the condition that the pulse width is uniformly reduced by 5%, the jitter is 39% in window width ratio. When the edge shift amount is measured, it can be suppressed to at most ±2 ns in the same way as with recording under the above standard recording conditions and in the standard environment. Inversely, the recording and reading apparatus and recording media are left at 0° C. When recording is performed under the recording conditions which are set in the apparatus without test recording being performed, the jitter is increased to 65% in window width ratio. The shift is also increased greatly such as to ±15 ns. In this state, test recording is performed on this magneto-optical disk. The test pattern used is repetition of 2Tw and 8Tw. To perform test recording, changes in the difference of the central values of amplitudes of the longest pattern and shortest pattern signals when the pulse width is uniformly changed and recorded within ranges of ±3%, ±6%, and ±10% are checked. The detection result of potential difference (ΔV) between the patterns is shown in FIG. 7. When the pulse width for ΔV=0 is obtained in this drawing, the value obtained under this condition is larger than that obtained at the room temperature by 7%. When a random pattern is recorded under the condition that the pulse width is uniformly increased by 7% on the assumption of the form of user information, the jitter is 39% in window width ratio. When the edge shift amount is measured, it can be suppressed to at most ±2 ns in the same way as with recording under the above standard recording conditions and in the standard environment.

Figure 8:
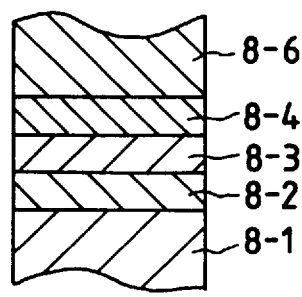
FIG. 8 is a schematic view of the cross sectional structure of a magneto-optical disk.
Figure 9:
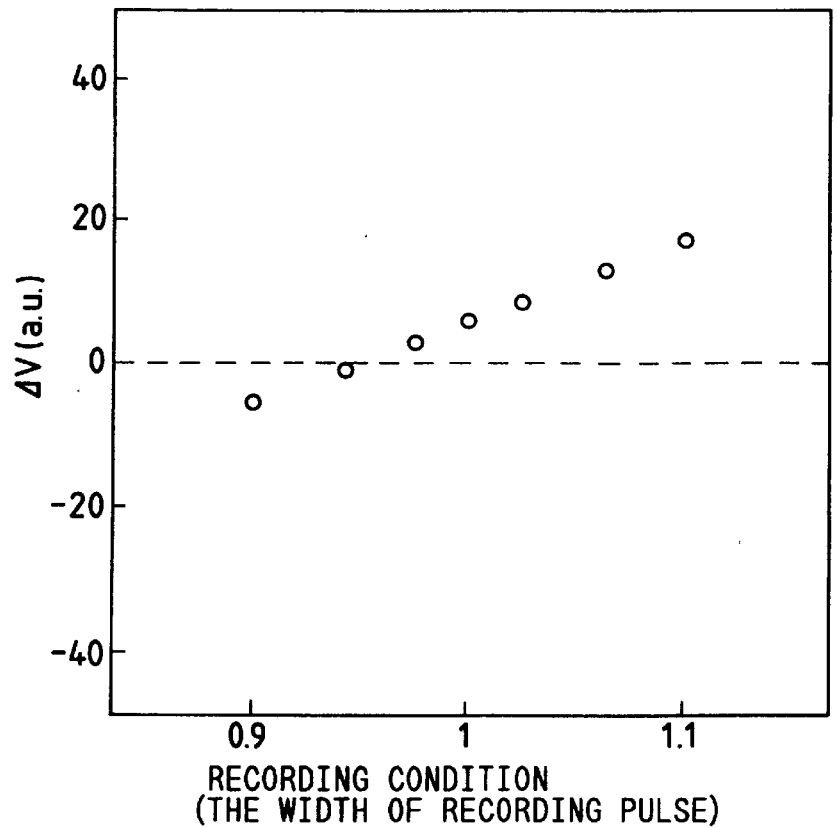
FIG. 9 is a drawing showing changes of the difference of the central values of signal amplitudes of a longest pattern of modulation code and a shortest pattern of modulation code and of the pulse width.

Furthermore, another embodiment will be described. In this example, the layer structure of each disk is different. Two magneto-optical disks such as a disk I having the structure shown in FIG. 2 and a disk II having the structure shown in FIG. 8 are used. On a plastic or glass substrate 8-1 of the disk II having an uneven guide groove on the surface thereof, a silicon nitride layer 8-2 is formed by the sputtering method. The layer thickness at that time is 75 nm. Next, a magneto-optical recording layer 8-3 is formed continuously in the vacuum state. The layer thickness is 100 nm. Then, a silicon nitride layer 8-4 is formed by the sputtering method again. The layer thickness at that time is 200 nm. The surface of this recording medium is coated with an ultraviolet curing resin 8-6 for protection. Two disks manufactured like this are sticked together so that the surfaces where recording media are formed are opposite to each other so as to form a single disk. Data is recorded on the two types of disks under the standard recording conditions and in the standard environment. The recording conditions which are set in the recording and reading apparatus are values which match the disk I, so that the jitter when recorded under the conditions is 39% in window width ratio and the edge shift amount is at most ±2 ns. Next, when data is recorded on the disk II under the conditions, the jitter is increased to 50% in window width ratio. The shift also increases greatly such as to ±10 ns. In this state, test recording is performed on this magneto-optical disk. The test pattern used is repetition of 2Tw and 8Tw. To perform test recording, changes in the difference of the central values of amplitudes of the longest pattern and shortest pattern signals when the pulse width is uniformly changed and recorded within ranges of ±3%, ±6%, and ±10% are checked. The detection result of potential difference (ΔV) between the patterns is shown in FIG. 9. When the pulse width for ΔV=0 is obtained in this drawing, the value obtained under this condition is smaller than that obtained at the room temperature by 5%. When a random pattern is recorded under the condition that the pulse width is uniformly increased by 5% on the assumption of the form of user information, the jitter is 39% in window width ratio. When the edge shift amount is measured, it can be suppressed to at most ±2 ns in the same way as with recording on the disk I. As mentioned above, even if the layer structure of a disk is different, by performing test recording, data can be recorded on the disk under the optimum condition always (a magnetic domain in the same shape can be formed with high precision). Even if the layer structure of a disk is different and the environment in which the recording and reading apparatus and recording media are used is also different, needless to say, by performing test recording, data can be recorded on the disk under the optimum condition always (a magnetic domain in the same shape can be formed with high precision). In this embodiment, a case that magneto-optical disks are used is explained. However, when the present invention is applied to write once type optical disks, a magnetic domain in the same shape can be formed with high precision. In this embodiment, an example of the (1,7) RLL modulation method is explained. However, needless to say, the same effect can be obtained by the (2,7) modulation method or the 8/9 modulation method by using the present invention.

Recording Example 2

FIG. 1 is drawings showing an embodiment of the present invention. FIG. 1(a) shows the relationship between the clock and control binary pulses, FIG. 1(b) an example of laser power for controlling a magneto-optical disk, FIG. 1(c) an example of temperature distribution of the magneto-optical disk medium controlled by the above laser power, and FIG. 1(d) the relationship between recording domains on the magneto-optical disk by the above temperature distribution and the reading code train.

A recording code train 1-20 is a recording code train indicated by the mark edge recording method and is outputted from an encoder which is not shown in the drawing in accordance with data to be recorded on the basis of a clock pulse 1-30. A binary recording pulse train 1-21a for control which is synchronized with the clock is generated in the pulse section of the recording code train 1-20 by using the recording code train 1-20. The recording pulse train 1-21a consists of two types of pulses such as a leading pulse in synchronization with the clock pulse 1-30 and a trailing edge excluding the leading pulse. A plurality of pulse intervals forming the recording pulse train 1-21a are in synchronization with the pulse interval of the clock pulse 1-30. The recording code time which is referred to as a pulse section of the recording code train 1-20 can be set optionally in integer times of ½ T. A recording pulse train 1-21b consists of a pulse train in which the pulse length is made short from the leading edges or trailing edges of the leading pulse and trailing pulse of the recording pulse train 1-21a uniformly by L.

Depending on thermal characteristics of a recording medium, the recording pulse train 1-21b may consist of a pulse train which is the same as that of the recording pulse train 1-21a without the above pulse length being made long or the pulse being adjusted. A recording auxiliary pulse 1-22 is a binary pulse consisting of by using the leading edge of the recording code train 1-20 and the clock pulse 1-30. These binary pulses give information of whether a laser beam power pulse is generated or not and the laser beam power waveform shown in FIG. 1(b) is formed by this information and information which is not shown in the drawing but decides the level of a laser beam power pulse.

The lowest level of laser beam power is the lowest power Pr for reading, and the high recording level is the recording power Pw of the recording pulse train 1-21b, and the low recording level is the recording power Pas of the recording auxiliary pulse 1-22.

By the laser beam power shown in FIG. 1(b), the temperature distribution shown in FIG. 1(c) is given onto the disk medium. The essential point is to control the temperature distribution corresponding to the recording code time and rest time in correspondence with the recording code train 1-20 at a predetermined level. It will be explained further with reference to FIG. 10.

Figure 10:
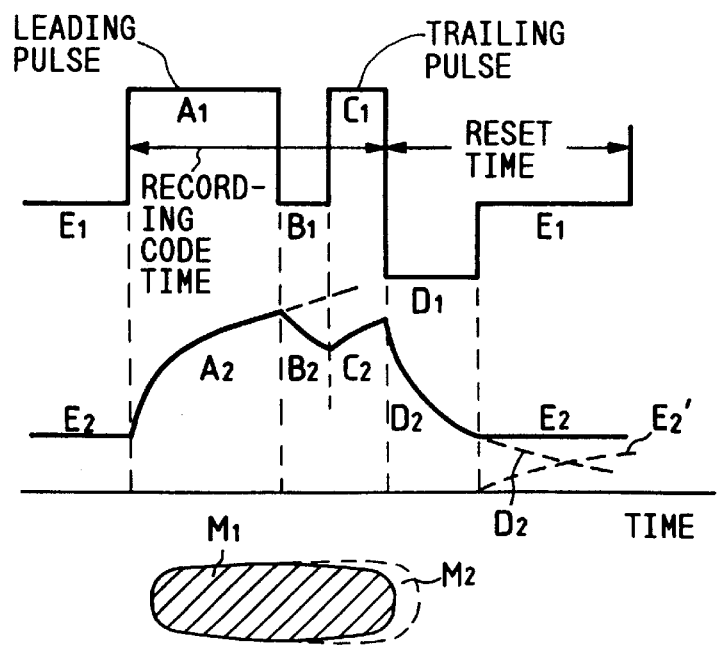
FIG. 10 is an illustration for the temperature distribution on a disk by the present invention.

FIG. 10 is an illustration for the temperature distribution on a disk by the present invention and analytically shows a laser power corresponding to one recording code time and rest time of the recording code train which is a part of FIG. 1(b) and the temperature distribution on the disk by it. In correspondence with a leading pulse $A_1$, a pulse interval $B_1$, a trailing edge $C_1$, and rest times $D_1$ and $E_1$ in correspondence with the recording code time, the respective temperature distributions are represented by $A_2$, $B_2$, $C_2$, $D_2$, and $E_2$.

By controlling the parts equivalent to the recording code time which are divided into the leading pulse $A_1$ and the trailing edge $C_1$, an almost fixed temperature distribution can be obtained, so that a recording domain which has a fixed width and length like $M_1$ can be obtained on the disk. If the part equivalent to the recording code time is occupied only by $A_1$, the temperature distribution $A_2$ continues integration further and rises like a dotted line. As a result, the width and length of the recording domain are changed like $M_2$ and an error may be caused.

By lowering the rest time to the $D_1$ level once so as to speed up down-movement of $D_2$ and raising the laser power to the $E_1$ level, an increase in temperature $E_2$' caused by it and a decrease in temperature $D_2$ are added and a fixed level $E_2$ can be obtained. If the rest time is not devised so as to be made constant like this, the temperature at the leading edge of the next pulse is changed according to the length of the rest time and difficult control or an error may be caused.

As mentioned above, by keeping the temperature level shown in FIG. 1(c) constant, the width and length of the recording domains shown in FIG. 1(d) are controlled within a fixed accuracy range and the amplitude of recording parts of a reading signal 1-24 becomes constant. By discriminating by the central level or a certain level of the reading signal 1-24, a reading code train 1-25 is generated.

Figure 11:
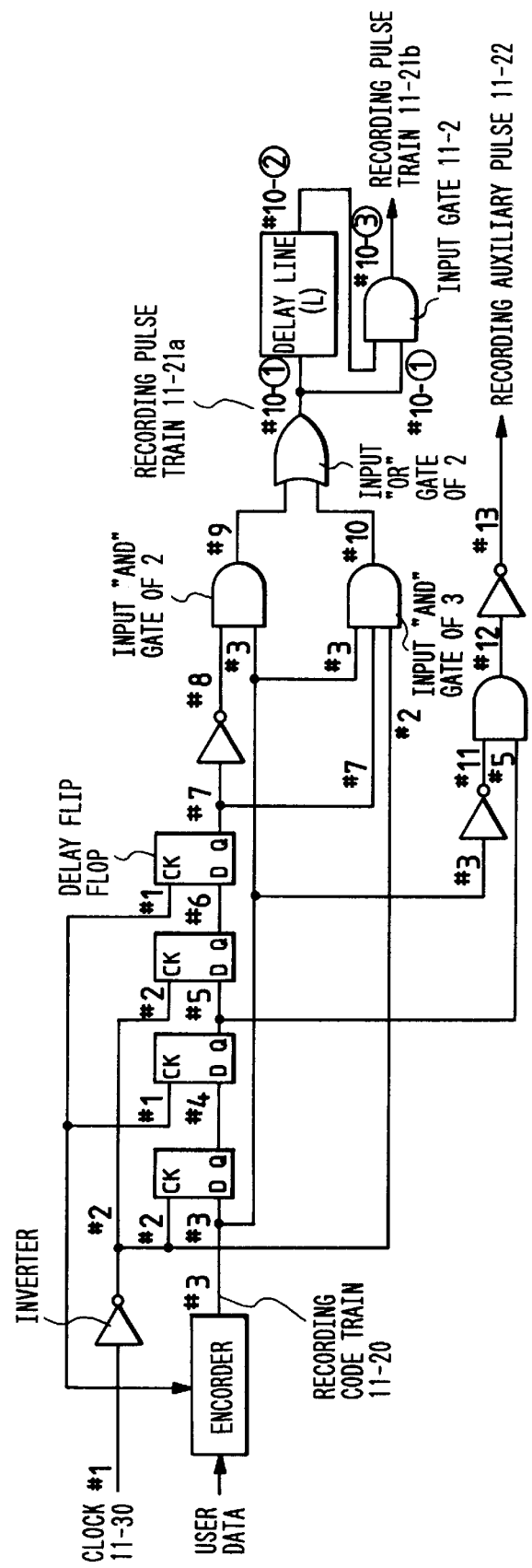
FIG. 11 is an embodiment drawing for generating the pulse train of the present invention.

FIG. 11 shows an embodiment for generating digital signals of the pulse trains shown in FIG. 1(a). The number symbols shown on the connection wires in the drawing are used to identify signals on the connection wires and mean the signals with the same numbers shown in the time chart in FIG. 13. In FIG. 11, a clock 11-30 is supplied from a crystal oscillator which is not shown in the drawing. Data is inputted into the encoder and outputs a recording code train 11-20. The recording code train 11-20 is inputted into the delay flip flop (D-FF) and delayed by integer times of ½ T (from ½ T to ½ T in this embodiment) (where the clock period is T) by using the clock 11-30 and a reflected signal of the clock 11-30 (an output signal obtained by inputting the clock 11-30 into the inverter). The recording pulse train 1-21b and the recording auxiliary pulse 1-22 shown in FIG. 1(a) are generated from these delayed recording code trains by using the inverter, "AND" gate, "OR" gate, and delay line. In this embodiment, the time delay of each element is ignored. As mentioned above, the pulse trains shown in FIG. 1(a) can be generated easily and precisely. It is desirable to make the delay time on the delay line variable according to thermal characteristics of a recording medium. To increase the pulse length of the recording pulse train 1-21b (in the opposite direction of L shown in FIG. 1), it is necessary to change the "AND" gate immediately before generating the recording pulse train 11-21b shown in FIG. 11 to an "OR" gate.

Figure 12:
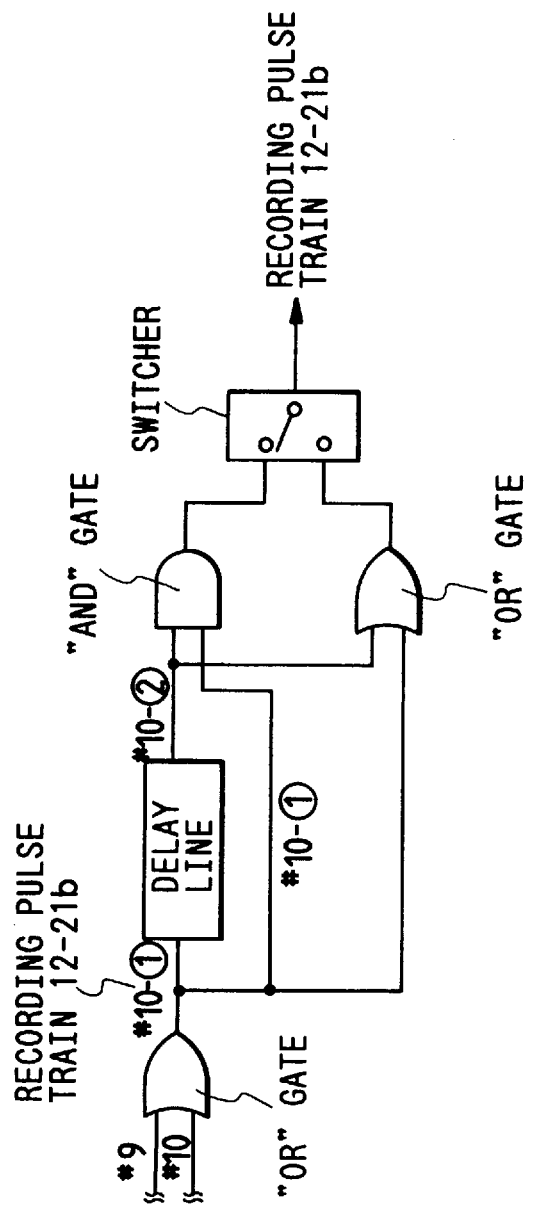
FIG. 12 is a drawing showing an example of the uniformly adjusted pulse length generation circuit of the present invention.

FIG. 12 is a drawing showing an example of a uniformly adjusted pulse length generation circuit for a recording pulse train. As shown in the drawing, by installing the "AND" gate immediately before generating the recording pulse train 11-21b shown in FIG. 11 and an "OR" gate additionally, supplying a signal, which is the same as the signal supplied to the "AND" gate, to the "OR" gate as shown in the drawing, and installing a switch which can switch outputs of both gates according to the recording condition, the pulse length of a pulse train can be shortened or lengthened uniformly in correspondence with various recording media.

Figure 13:
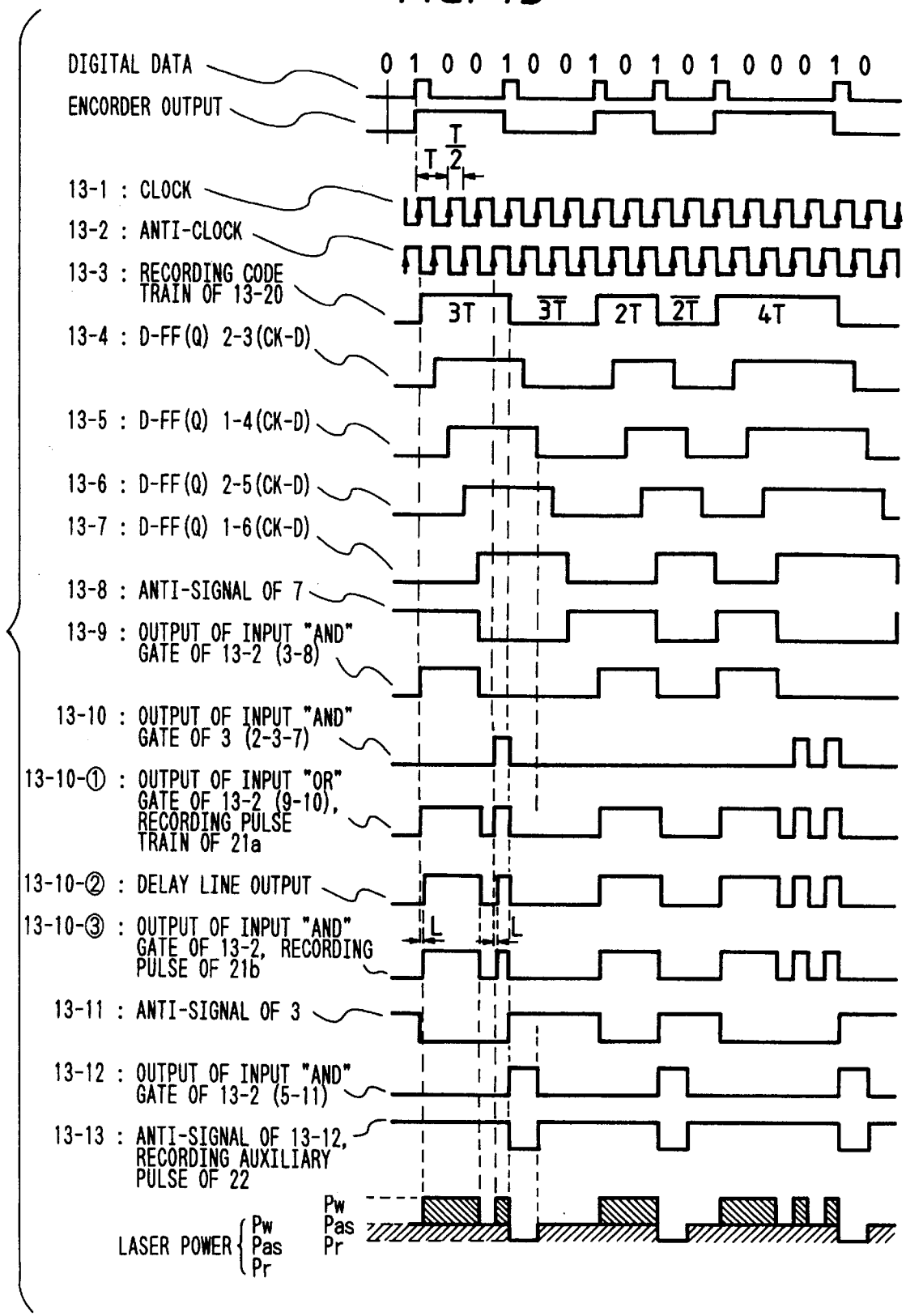
FIG. 13 is a time chart of generation of the pulse train of the present invention.

FIG. 13 is a time chart of generation of pulse trains. The drawing shows a time chart of a signal at each part on the connection wires shown in FIG. 11 from an encoder output 13-3 corresponding to the digital data 010010 . . . shown at the top of the drawing, that is, a recording code train 13-20, a clock signal 13-1, and an anti-clock 13-2 to a laser power at the bottom of the drawing.

In the drawing, numerals 13-4 to 13-7 indicate output signals of the delay flip flop. For example, the signal of 13-4 is an output signal which is obtained by inputting the anti-clock signal 13-2 and an encoder output signal 13-3 into the delay flip flop. A signal for holding the encoder output level at the leading edge of the anti-clock is outputted. Numeral 13-8 indicates an anti-signal of 7 which is obtained by the inverter. A signal of 13-9 is obtained by inputting the signals of 13-3 and 13-8 into an input "AND" gate of 13-2 and a signal of 13-10 is obtained by inputting the signals of 13-2, 13-3, and 13-7 into an input "AND" gate of 13-3. The respective pulses of the signals of 13-9 and 13-10 are bases for a leading pulse and trailing edge within the recording code time. Numeral 13-10-[1] indicates a recording pulse train 13-21a, which is obtained as an output when the signals of 13-9 and 13-10 are inputted into the input "OR" gate of 13-2 and consists of a plurality of types of pulses of integer times of ½ T. Numeral 13-10-[2] indicates a signal which is obtained by delaying the signal of 13-10-[1] by L by the delay line. By adding the signals of 13-10-[1] and 13-10-[2] to the input "AND" gate of 13-2, a signal of 13-10-[3], that is, a signal of recording pulse train 13-21b is obtained. It is indicated that the pulse length of the signal of 13-10-[3] is shortened uniformly by the uniformly adjusted pulse length L compared with the signal of 13-10-[1]. FIG. 13 shows an example that the pulse length is shortened by the adjusted pulse length.

A recording auxiliary pulse of 13-22 is obtained by reversing a signal of 13-12, which is obtained by inputting an anti-signal 13-11 of an encoder output and the output signal of 13-5 of the delay flip flop into the "AND" gate, furthermore by the inverter.

The above signal of recording pulse train 13-21b and the signal of recording auxiliary pulse 13-22 are supplied to the laser and a laser power with a required width at the low recording level Pas and high recording level Pw is formed on the lowest reading level Pr.

As mentioned above, according to the present invention, the high densification of the mark edge recording method is used, and the defect of a difficulty in making the above recording method highly precise can be eliminated, and it can be realized simply without using a special apparatus.

Next, examples that the present invention is applied to write once type optical disks will be described.

Recording Example 3

Figure 14A:
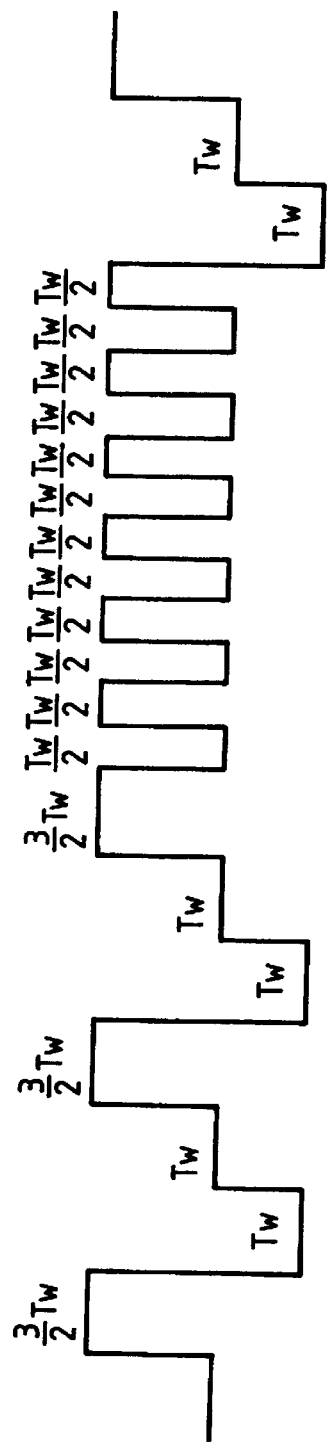
FIGS. 14a–14c are drawings showing the waveform used for recording.
Figure 14B:
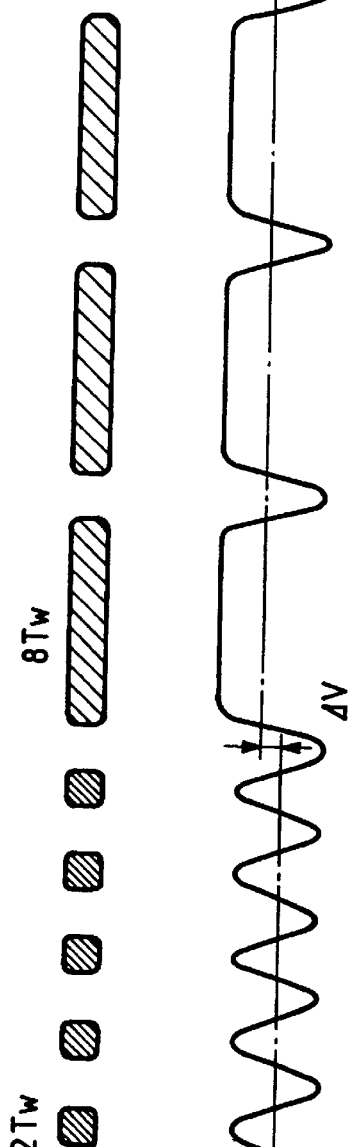
Figure 14C:
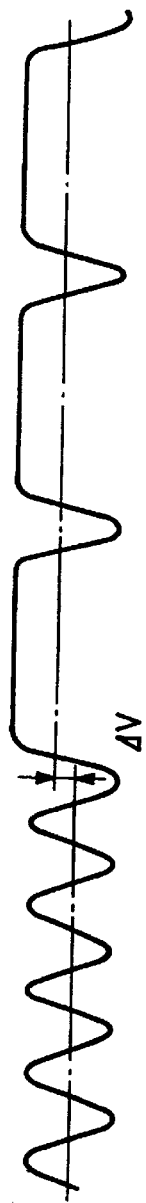

For each of the disks used in the present invention, a nitrocellulose layer is formed on the 12" glass substrate on which an uneven guide groove is formed by ultraviolet curing resin. A pbTeSe recording layer is formed on it and each disk is assembled so that the recording layer is on the inner side so as to form a hollow structure (air sandwich structure). This type of disk is a hole type and write once type optical disk. Test recording is performed prior to recording user information on the disk. The pattern used for test recording is shown in FIG. 14. The recording temperature of this recording layer is about 450° C. To record one pattern, a multi-pulse consisting of minutely split pulses is used. In this embodiment, the mark edge recording method of the (1,7) RLL method is used as a modulation method. The longest pattern is 8Tw and the shortest pattern is 2Tw. The number of revolutions of each disk is 1200 rpm. Assuming that repetition of recording of the longest pattern 5 times and then repetition of recording of the shortest pattern 5 times is one period, 5 points in total are recorded by shifting the power around the standard power in units of ±10%. The records are read, and the jitter and standard deviation are obtained, and a recording condition (mainly laser power) under which these values are less than fixed values is searched for. For measurement of the jitter and standard deviation, a time interval analyzer is used. As a result, the jitter can be suppressed to at most ±3 ns. When recorded under this optimum condition, the central values of the amplitudes of the shortest pattern and longest pattern match with each other. It is found that obtaining of the central values of the amplitudes of the shortest pattern and longest pattern have the same effect and controllability as obtaining of the jitter and standard deviation. When the recording means of the present invention is used, data can be recorded under the optimum condition, so that it is found that recording domains in the same shape are formed. When this respect is confirmed by observation of a scanning electron microscope and evaluation of electric signals, it is found that recording domains in the good shape are formed. Among the formed recording domains, it can be confirmed from electric signals and observation of domains that the longest domain and shortest domain are equal in width and particularly the domain width of the longest domain is fixed. For electric signals, the aforementioned can be confirmed from that the amplitude of each domain is almost constant. Hole type optical disks are used in the above example. However, the effect of the present invention does not depend on the optical disk type and disks of any of the alloy type, phase change type, and bubble forming type may be used. The reason that a multi pulse is used as a recording pulse is to control the thermal flow in a recording medium. By doing this, the domain width can be made constant. Needless to say, it is desirable to change the pulse width and gap width depending on the coefficient of thermal conductivity of the recording layer.

As mentioned above, compared with a magneto-optical disk, the temperture of the recording layer of a write once type optical disk during recording is higher by more than 100° C. and is at least 400° C. and the disk is insensitive to changes in the ambient temperature.

Embodiments for an art for reading the part recorded by the aforementioned highly precise recording art with high precision will be described hereunder.

Example of Reading System 1

Figure 15:
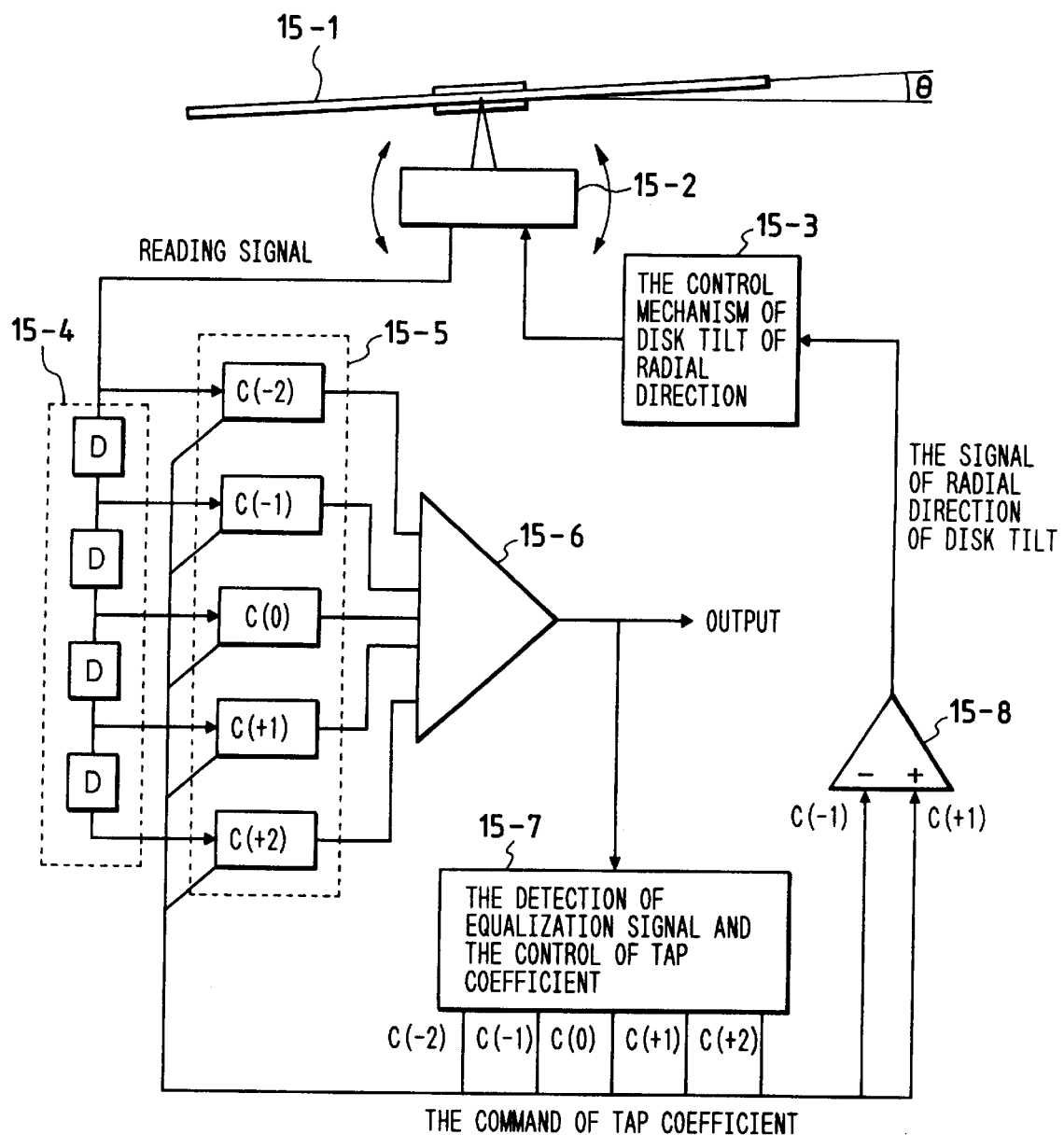
FIG. 15 is a schematic view showing the structure of a waveform distortion removal apparatus for a reading signal generated by the tilt of the optical disk shown in Example 1 of the reading system of the present invention.

FIG. 15 is a schematic view showing the structure of an apparatus for removing waveform distortion generated by the tilt of the optical disk shown in this embodiment. In this embodiment, an example that waveform distortion generated is removed by detecting the tilt of the optical head in the peripheral direction of the optical disk will be explained.

For an optical disk 15-1 fixed to a spindle (not shown in the drawing) so that it can be removed, an optical spot 15-9 for recording and reading is focused onto the recording medium surface of the optical disk 15-1 from an optical head 15-2 beyond the substrate. The optical spot 15-9 is a laser beam which is emanated from a semiconductor laser with a wave length of 780 nm (not shown in the drawing) installed inside the optical head 15-2, converted to a parallel beam by a collimator lens and prism (not shown in the drawing), passes through an optical system consisting of a prism having polarization characteristics, and is focused by an object lens with a numerical aperture of 0.55 finally. The optical head 15-2 can be driven back and forth in the radial direction of the optical disk along a guide mechanism (not shown in the drawing). The entire guide mechanism can rotate in the driving direction of the optical head 15-2 and the rotation is controlled by a disk tilt control mechanism 15-3. On the other hand, a reading signal from the optical head 15-2 passes through four delay lines 15-4 having a delay time equivalent to the signal identification time interval. Five reading signals which are delayed in a group by the identification time interval pass through weighting circuits (tap coefficient setting circuits) 15-5 installed in time series, are added by an adder 15-6, and become an output signal. The weight of each weighting circuit 15-5 is called a tap coefficient hereinafter and they are assumed as $C(-2)$, $C(-1)$, $C(0)$, $C(1)$, and $C(2)$ respectively. Each tap coefficient can be changed, for example, by a 4-bit digital signal. An output signal from the adder 6 is inputted into an equalization error detection and tap coefficient control unit 15-7. In the equalization error detection and tap coefficient control unit 15-7, the tap coefficients are updated so as to minimize the waveform distortion and the updated values are supplied to the respective tap coefficient weighting circuits 15-5 in 4-bit digital signals. The updated values of $C(-1)$ and $C(1)$ among the tap coefficients are inputted into a comparator 15-8 and a value of $\Delta=C(1)-C(-1)$ is outputted as an error signal $\Delta$ for disk tilt adjustment control. This value is supplied to the above disk tilt control mechanism 15-3 and the tilt of the optical head is adjusted so that the error signal $\alpha$ becomes zero (0). For explanation in this embodiment, the number of taps is assumed as 5. However, when the number of taps is at least 3, the present invention can be applied without the performance thereof being lost.

Figure 16:
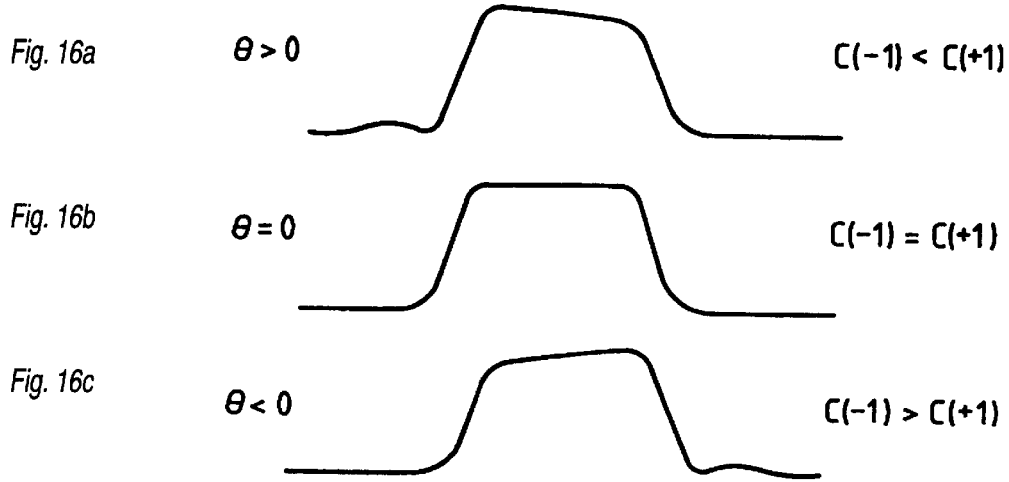
FIGS. 16a–16c are illustrations showing the form of waveform distortion of a reading signal generated by the tilt of the optical disk shown in Example 1 of the reading system of the present invention.

Next, that the error signal $\alpha$ outputted from the comparator 15-8 becomes an error signal for disk tilt adjustment control will be explained with reference to FIGS. 16 and 17. When the tilt angle $\theta$ of the optical head 15-2 to the optical disk 15-1 is positive, as shown in FIG. 16($a$), in the reading signal waveform of recording bit, a side peak is generated on the front edge side and the signal level at the trailing edge lowers at the same time. To remove such a waveform distortion by an equalizer, it is desirable to increase the tap coefficient $C(1)$ and to raise the signal level at the trailing edge. Namely, the error signal $\Delta>0$. Inversely, when the tilt angle $\theta$ of the optical head 15-2 to the optical disk 15-1 is negative, as shown in FIG. 16($c$), in the reading signal waveform of recording bit, a side peak is generated on the trailing edge side and the signal level at the leading edge lowers at the same time. To remove such a waveform distortion by an equalizer, it is desirable to increase the tap coefficient $C(-1)$ and to raise the signal level at the leading edge. Namely, the error signal $\Delta<0$. Like this, it is expected that the tilt angle θ of the optical disk is in direct proportion to the error signal Δ. When the relationship between the error signal Δ (%) and the tilt of the optical disk (milliradian: mrad) is obtained from the tap coefficient obtained by performing a computer simulation actually in consideration of the tilt of the optical disk and executing equalization by the computer so as to minimize the waveform distortion using the obtained reading signal waveform, the error signal Δ is in direct proportion to the tilt of the optical disk within a range from −4 mrad to +4 mrad as shown in FIG. 18. From the aforementioned, it can be confirmed that the tilt control servo can be executed using error signal Δ=0 as an target point. In the simulation, a laser wave length of 780 nm, a numerical aperture of the lens of 0.55, and a disk substrate thickness of 1.2 mm are used for calculation.

Figure 17:
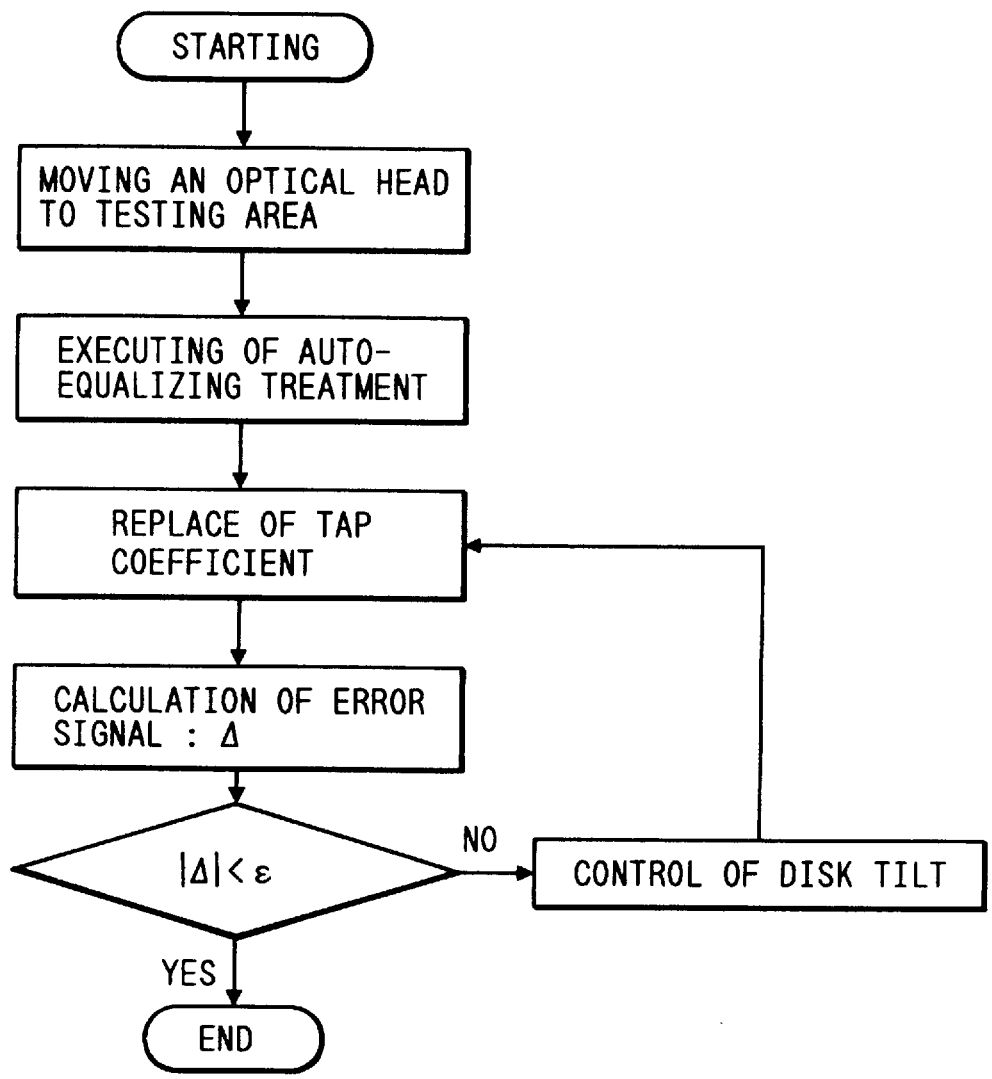
FIG. 17 is a block diagram showing the processing flow of tilt adjustment and control of the optical disk shown in Example 1 of the reading system of the present invention.
Figure 18:
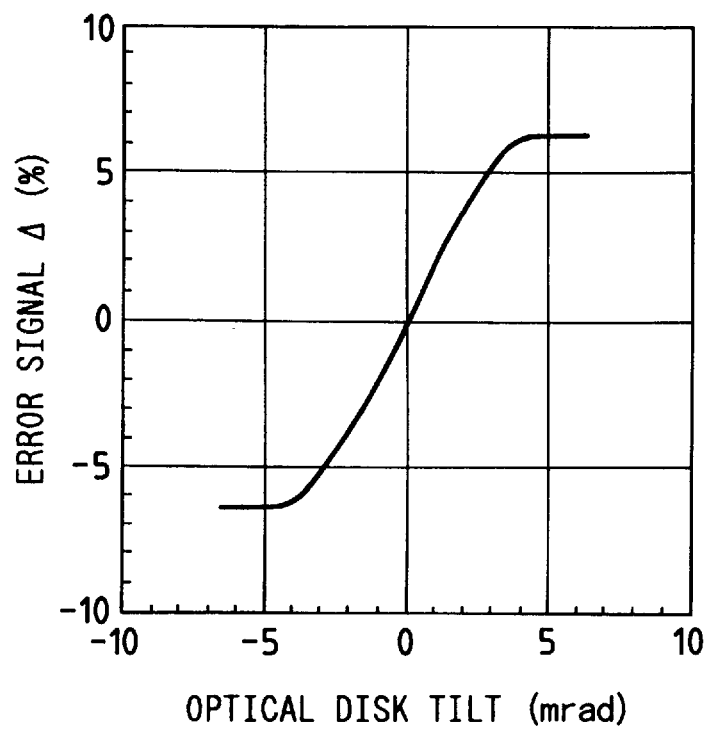
FIG. 18 is a graph showing the relationship between the tilt of the optical disk shown in Example 1 of the reading system of the present invention and the error signal $\Delta$ value.

Next, a flow chart of the control processing of the tilt of optical disk is shown in FIG. 17. When the optical disk is loaded, the optical head moves to the testing information area where the testing information pit is stored. The automatic equalizer starts operation and the tap coefficient is updated. The error signal Δ is calculated from this updated value and when it is larger than a preset value ε, the rotational direction is decided according to the positive or negative and the head is rotated at an angle in proportion to the absolute value of the error signal Δ. The magnitude of the set value ε depends on the maximum magnitude of the remaining distortion which can be permitted. For example, when the tilt crossing is suppressed to a range from −2 mrad to +2 mrad, it is desirable to set the ε value to 2% as shown in FIG. 18. The above processing is repeated until the absolute value of the error signal Δ becomes smaller than the set value ε. When the tilt control ends when the optical disk is loaded, the tilt control servo is stopped and the tilt of the optical head is fixed. Although a waveform distortion is generated in a reading signal by a coma aberration generated by the remaining tilt which cannot be removed by mechanical control and a slight tilt due to upper or lower contact when the optical disk rotates, it can be removed adaptively by continuation of the automatic equalization.

According to the present invention, there is no limit to the rotary mechanism of the optical head 15-2. Any rotary mechanism may be applied without the performance of the present invention being lost. A prepit is desirable as a pit recorded in the testing area, though it may be a magneto-optical domain or a recording pit formed on a write once type optical disk and the recording pit is not limited. Furthermore, the testing area may be set in any location of the optical disk surface to which the optical head can move and it is obvious that the performance of the present invention will not be lost by it.

Example of Reading System 2

Figure 19:
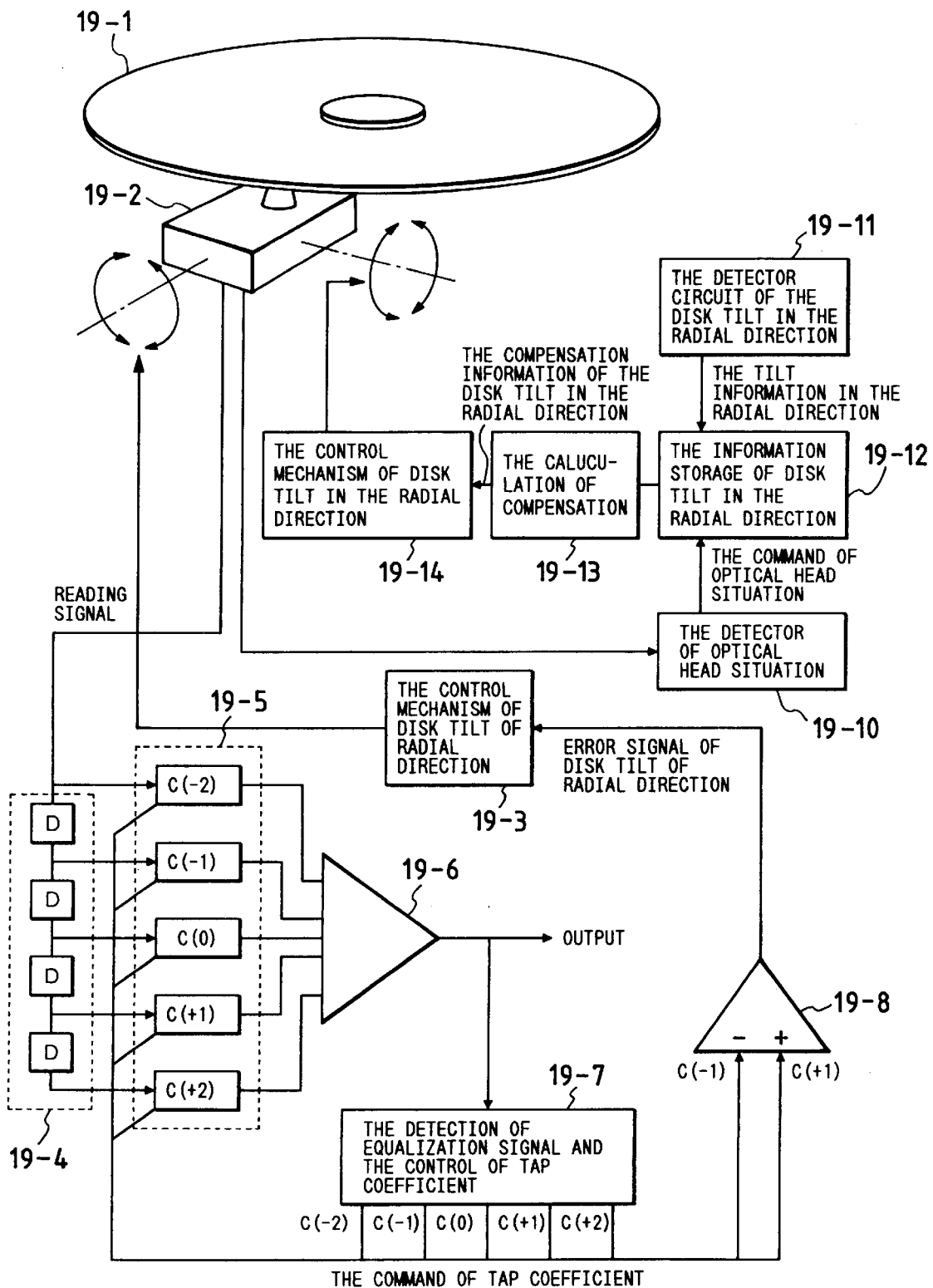
FIG. 19 is a schematic view showing the structure of a waveform distortion removal apparatus for a reading signal generated by the tilt of the optical disk shown in Example 2 of the reading system of the present invention.

FIG. 19 is a schematic view showing the structure of an apparatus for removing waveform distortion generated by the tilts of the optical disk in the peripheral direction and radial direction in this embodiment. A difference from FIG. 15 described in Embodiment 1 is that a mechanism for detecting and correcting the tilt of the head in the radial direction is added.

In FIG. 19, when an optical disk 19-1 is loaded, an optical head 19-2 moves to the track locations which are specified by a head mechanism (not shown in the drawing) beforehand sequentially from the inner side to the outer side (or from the outer side to the inner side). During that period, a detector of optical head situation 19-10 reads the address information of each track of the optical disk, stops at the specified track location, obtains the information of the tilt between the optical disk 19-1 and the optical head 19-2 from a detector circuit of disk tilt in radial direction 1911, and stores it in an information storage of disk tilt in radial direction 19-12 together with the location information of the optical head. For track locations for detecting tilt information in the radial direction, tracks almost at the center of each area which is obtained, for example, by dividing the distance between the inner side and outer side into 8 parts are representative tracks. Tilt information of the other tracks is interpolated and calculated from the tilt information of the neighboring representative tracks by a calculation unit of compensation 19-13. When this operation ends and the optical head 19-2 moves to an optional track, the location information of the track is read by the detector of optical head situation 1910, and the tilt information of the neighboring representative tracks is read by the information storage of disk tilt in radial direction 19-12, and it is inputted into the calculation unit of compensation 19-13, and then tilt compensation information is obtained. It is sent to a control mechanism of disk tilt in radial direction 19-14 and the tilt in the radial direction is corrected by controlling the posture of the optical head 19-2. The priority between the correction in the radial direction and that in the peripheral direction is not limited in this embodiment.

Example of Reading System 3

Figure 21:
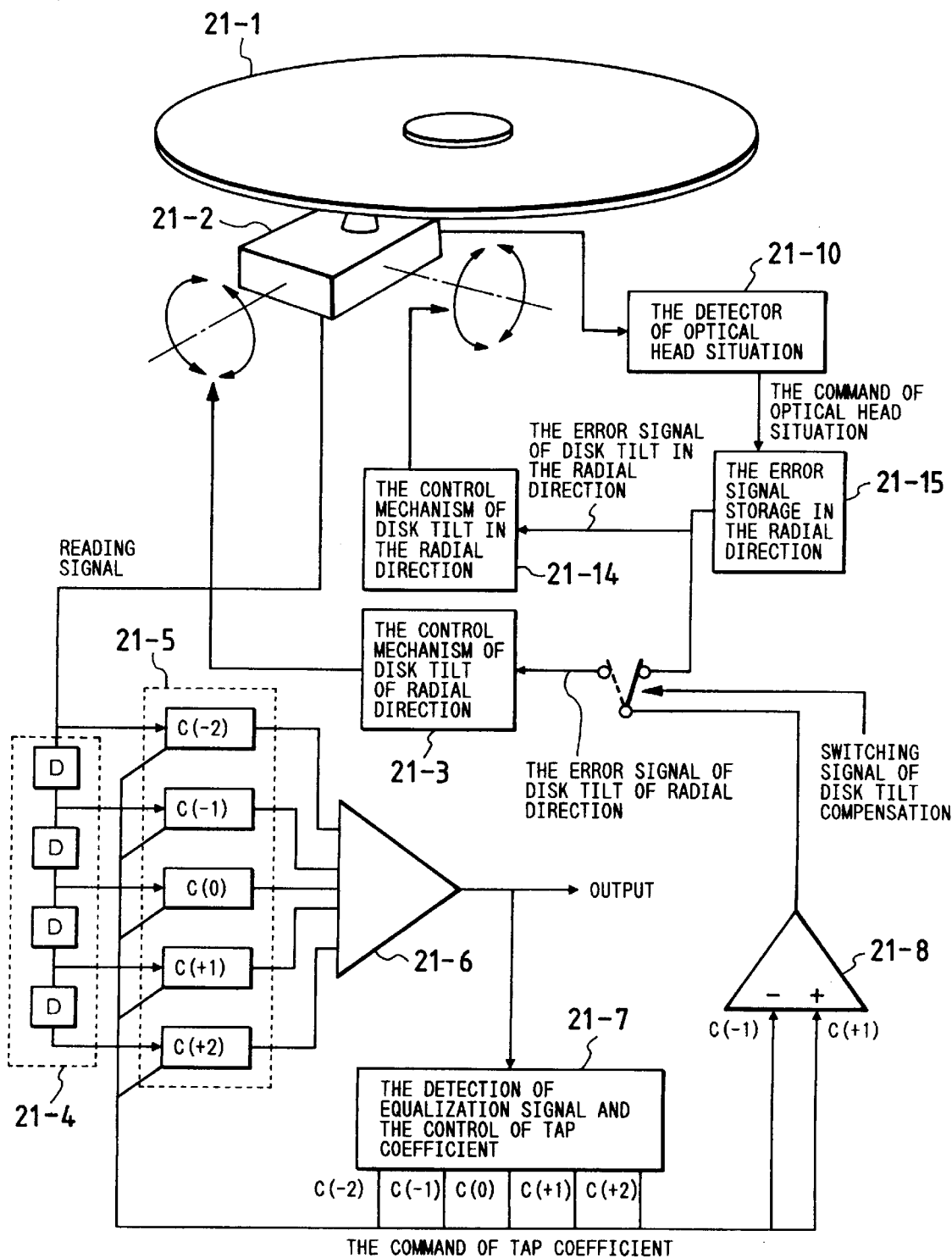
FIG. 21 is a schematic view showing the structure of a waveform distortion removal apparatus for a reading signal generated by the tilt of the optical disk shown in Example 3 of the reading system of the present invention.

FIG. 20 is an illustration for obtaining a tilt error signal in the radial direction of an optical disk shown in this embodiment. FIG. 21 is a schematic view showing the structure of an apparatus for removing waveform distortion of a reading signal generated by the tilts of the optical disk in the radial direction and peripheral direction.

As shown in FIG. 20, when the optical disk and optical head are tilted in the radial direction, a side spot 20-17 due to a coma aberration is generated in a main optical spot 20-16 and interferes with the neighboring tracks. When the tilt is positive (FIG. 20(*a*)) or negative (FIG. 20(*b*)), the side spot 20-17 is generated on the inner side of the optical disk or on the outer side. When testing recording pits 20-18, 20-19, and 20-20 are shifted at a fixed interval each on the neighboring tracks, in the same way as with the waveform distortion generated by the tilt of the optical disk shown in FIG. 16, a waveform distortion which is the same as that generated by a coma aberration in the peripheral direction is generated in the reading signal waveform of the testing recording pit 20-19. When the tap coefficient is optimized so as to remove this distortion, the value of C(1)−C(−1) changes the polarity according to the positive or negative of the relative tilt between the optical disk and optical head and can be used as a tilt error signal in the radial direction.

Next, using the apparatus for removing the waveform distortion of a reading signal shown in FIG. 7, the procedure for correcting the tilt of an actual optical disk will be explained hereunder.

When the optical disk 20-1 is loaded, the optical head 20-2 moves to the testing area where testing information pits are recorded by a head driving mechanism (not shown in the drawing). A tilt correction switching signal switches the circuit path to a control mechanism in peripheral direction 20-3. Thereafter, as shown in Example of reading system 1, the tilt in the peripheral direction is corrected. The detailed procedure is explained in Embodiment 1 already, so that the explanation will be omitted here.

Next, the tilt correction switching signal switches the circuit path to a control mechanism in radial direction 20-14.

The optical head 20-2 moves to the track locations which are specified by a head mechanism (not shown in the drawing) beforehand sequentially from the inner side to the outer side (or from the outer side to the inner side). During that period, a detector of optical head situation 20-10 reads the address information of each track of the optical disk, stops at the specified track location, obtains the information of the tilt between the optical disk 20-1 and the optical head 20-2 as error signal Δ=C(1)−C(−1) which is calculated from the tap coefficient, and stores it in a tilt error signal memory in radial direction 20-15 together with the location information of the optical head. For track locations for detecting a tilt error signal in the radial direction, tracks almost at the center of each area which is obtained, for example, by dividing the distance between the inner side and outer side into 8 parts are representative tracks. Tilt information of the other tracks is interpolated and calculated from the tilt information of the neighboring representative tracks separately. When this operation ends and the optical head 20-2 moves to an optional track, the location information of the track is read by the detector of optical head situation 20-10, and the tilt error signals of the neighboring representative tracks are read by the information storage of disk tilt in radial direction 20-15, and it is sent to a control mechanism of disk tilt in radial direction 20-14, and the tilt in the radial direction can be corrected by controlling the posture of the optical head 20-2.

In the examples of the reading system mentioned above, the numerical aperture NA of the object lens is 0.55, and the disk substrate thickness is 1.2 mm, and the wave length of light to be used is 680 nm. However, the effect of the present invention is not limited to these values.

What is claimed is:

1. A method for recording an optical information signal on an optical disk in an optical recording and reading apparatus, comprising the steps of:
   (a) converting the optical information signal to be recorded into a code train;
   (b) modulating a first light beam in accordance with said code train to form a modulated first light beam, said modulated first light beam comprising a plurality of micropulses including:
      at least one first light pulse having a power of Pw or higher, said first light pulse being sufficiently powerful to form a recording mark,
      at least one second light pulse having a power of Pas or less, said second light pulse not being sufficiently powerful to form a recording mark, and
      a third pulse have a power level of Pr or less provided on at least one of the front side and the back side of the first light pulse, wherein Pw>Pas>Pr;

(c) shifting a pulse edge of said modulated first light beam in accordance with a comparison from a pre-write testing, said pre-write testing comprising the steps of:
      (c1) modulating a second light beam by a special test signal so as to record a test pattern on a test track of the recording medium;
      (c2) reproducing said test pattern from said test track to obtain a reproduced test pattern signal; and
      (c3) comparing said reproduced test pattern signal with said special test signal;
   (d) irradiating a recording medium with said shifted, modulated first light beam, and
   (e) recording said code train as a recording mark.

2. The method of claim 1, wherein said pre-write testing includes the steps of:
   recording a repetition of a shortest pattern and pulse interval, and a repetition of a longest pattern and shortest pulse interval;
   reading said recorded patterns;
   detecting a voltage difference at centers of signal amplitudes of said recorded patterns which have been read; and
   selecting a pulse width corresponding to a voltage difference of zero, said selected pulse width associated with a formation of domains having a substantially same shape.

3. The method of claim 1, wherein pre-write testing is performed either at a fixed time interval, or after a recording instruction is issued, after which information is recorded.

4. The method of claim 1, wherein information is recorded by a mark edge recording method for recording information at an edge of a domain.

5. The method of claim 1, wherein the optical disk is divided into a plurality of zones, and information is recorded such that a substantially same recording density is created throughout each zone.

6. The method of claim 1, wherein the optical disk is divided into a plurality of zones, and pre-write testing is performed in a fixed area in each zone, before information is recorded.

7. The method of claim 1, wherein, before information is recorded on the disk,
   pre-write testing is performed at a first, fixed time interval when either the apparatus is started, or the optical disk is loaded, and
   pre-write testing is performed at a second time interval longer than said first, fixed time interval, when a temperature of either the apparatus, or the optical disk, or both, is constant.

8. The method of claim 7, wherein the pre-write testing is performed on a magneto-optical disk.

9. The method of claim 1, wherein said optical disk is a write once-type optical disk, on which a user may record information only once.

10. The method of claim 9, wherein, before information is recorded on the optical disk:
    pre-write testing is performed on the optical disk using a fixed pattern;
    pre-write tested data is read from said optical disk;
    statistics of said read pre-write tested data are taken to form a result,
    power emitted by a light source is controlled based on said result, and
    recording domains having a substantially same size are formed.

11. The method of claim 1, wherein:
    a reference fixed pattern signal is recorded in a fixed area of the disk beforehand,
    pre-write tested data is read from said optical disk;
    statistics of said read pre-write tested data are taken to form a result,
    a most suitable power is obtained by comparing the result with the recorded signal, and
    recording domains having substantially a same size are formed without being affected by changes in recording conditions.

12. The method of claim 1, wherein pre-write testing is performed when either a disk driver is started, or the disk is loaded into the driver.

13. The method of claim 1, wherein, as an information recording method, changes in a reflective index of a recording layer are recorded by using at least one selected from the group consisting of: 1) changes in a crystal status of the recording layer, 2) changes in a refractive index, 3) changes in a light absorption coefficient of a wavelength of light used for reading, and 4) changes in a light reflective index due to formation of an alloy part, formation of a light diffused reflection layer, or formation of a lost part of the recording layer.

14. The method of claim 1, wherein a size of formed recording points is at most 0.4 $\mu$m/bit.

* * * * *